(12) United States Patent
Konduru et al.

(10) Patent No.: US 10,853,879 B2
(45) Date of Patent: Dec. 1, 2020

(54) SYSTEMS AND METHODS FOR REDUCING DATA LOOKUPS WITHIN A SET OF QUEUES

(71) Applicant: Chicago Mercantile Exchange Inc., Chicago, IL (US)

(72) Inventors: Dileep Konduru, Chicago, IL (US); Eric Schuldt, Chicago, IL (US); José Antonio Acuña-Rohter, Chicago, IL (US); Akira Yamaguchi, Chicago, IL (US); Kevin Bulman, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 768 days.

(21) Appl. No.: 15/048,578

(22) Filed: Feb. 19, 2016

(65) Prior Publication Data

US 2017/0243291 A1    Aug. 24, 2017

(51) Int. Cl.
*G06Q 40/04* (2012.01)
*G06Q 30/06* (2012.01)

(52) U.S. Cl.
CPC ......... *G06Q 40/04* (2013.01); *G06Q 30/0605* (2013.01)

(58) Field of Classification Search
CPC ............................ G06Q 40/04; G06Q 30/0605
See application file for complete search history.

(56) References Cited

U.S. PATENT DOCUMENTS

| | | | |
|---|---|---|---|
| 7,039,610 B2 | 5/2006 | Morano et al. | |
| 7,747,493 B1 * | 6/2010 | Monroe | G06Q 30/0601 |
| | | | 705/35 |
| 7,831,491 B2 | 11/2010 | Newell et al. | |
| 7,853,499 B2 | 12/2010 | Czupek et al. | |
| 7,882,012 B1 * | 2/2011 | West | G06Q 40/04 |
| | | | 705/37 |

(Continued)

OTHER PUBLICATIONS

"An Overview of Routing and Staffing Algorithms in Multi-Skill Customer Contact Centers", Ger Koole & Auke Pot, "Department of Mathematics, Vrije Universiteit Amsterdam, The Netherlands", Mar. 6, 2006, p. 16 (Year: 2006).*

(Continued)

*Primary Examiner* — Kito R Robinson
*Assistant Examiner* — Tony P Kanaan
(74) *Attorney, Agent, or Firm* — Lempia Summerfield Katz LLC

(57) ABSTRACT

A computer implemented method for aggregating quantities associated with messages includes: generating an implied message for an object based on two constituent messages, wherein the implied message is associated with a value based on the values of the constituent messages, a priority that is equivalent to the lower of the priorities of the constituent messages, and a quantity that is equivalent to the lesser of the quantities of the constituent messages, receiving third and fourth messages, increasing the quantity of the implied message based on the received messages, and upon an occurrence of a match event involving the implied message, automatically allocating all of the quantity of the implied message for matching during the match event before allocating any of the quantity associated with the third message for matching during the match event.

43 Claims, 24 Drawing Sheets

(56) References Cited

U.S. PATENT DOCUMENTS

| | | | |
|---|---|---|---|
| 8,090,641 B1* | 1/2012 | Monroe | G06Q 40/04 |
| | | | 705/37 |
| 8,266,030 B2* | 9/2012 | Milne | G06Q 40/06 |
| | | | 705/35 |
| 9,652,804 B2* | 5/2017 | Bonig | H04L 49/9036 |
| 9,916,623 B2* | 3/2018 | Shontz | G06Q 40/04 |
| 10,417,709 B2* | 9/2019 | Hosman | H04L 67/42 |
| 10,430,881 B2* | 10/2019 | Bixby | G06Q 40/04 |
| 2005/0096999 A1 | 5/2005 | Newell et al. | |
| 2005/0203826 A1 | 9/2005 | Farrell et al. | |
| 2007/0100732 A1* | 5/2007 | Ibbotson | G06Q 40/06 |
| | | | 705/37 |
| 2009/0064147 A1* | 3/2009 | Beckerle | G06F 9/5038 |
| | | | 718/101 |
| 2010/0174633 A1* | 7/2010 | Milne | G06Q 40/06 |
| | | | 705/37 |
| 2012/0317011 A1* | 12/2012 | Duquette | G06Q 40/04 |
| | | | 705/37 |
| 2014/0006243 A1 | 1/2014 | Boudreault et al. | |
| 2014/0379552 A1* | 12/2014 | Duquette | G06Q 40/04 |
| | | | 705/37 |
| 2015/0026033 A1* | 1/2015 | Curran | G06Q 40/04 |
| | | | 705/37 |
| 2015/0127509 A1* | 5/2015 | Studnitzer | G06Q 40/04 |
| | | | 705/37 |
| 2015/0127516 A1 | 5/2015 | Studnitzer et al. | |
| 2015/0262298 A1* | 9/2015 | Callaway | G06Q 40/04 |
| | | | 705/37 |
| 2016/0086269 A1* | 3/2016 | Baker | G06Q 40/04 |
| | | | 705/37 |
| 2016/0092984 A1* | 3/2016 | Shontz | G06Q 40/04 |
| | | | 705/37 |
| 2017/0103457 A1* | 4/2017 | Acuna-Rohter | G06Q 20/10 |
| 2017/0103461 A1* | 4/2017 | Acuna-Rohter | G06Q 40/04 |
| 2017/0193601 A1* | 7/2017 | Mangutov | G06Q 40/04 |
| 2017/0278189 A1* | 9/2017 | Ignatovich | G06Q 40/04 |

OTHER PUBLICATIONS

International Search Report and Written Opinion from, PCT/US2017/017755, dated May 11, 2017, WO.

* cited by examiner

SYSTEMS AND METHODS FOR REDUCING DATA LOOKUPS WITHIN A SET OF QUEUES

BACKGROUND

Data access and retrieval is a core aspect of today's computing systems. Data may be stored in a variety of different locations and data structures. A computing routine may call for data retrieval from a variety of different data sources. Computing systems may implement a variety of lookups or pointers to logically access data as needed. In systems including a vast number of datasets stored in different data structures, frequent data retrieval can reduce computer processing speed and efficiency. For example, in systems having multiple queues or data storage structures, where each queue prioritizes its own data, data retrieval from the various queues or discrete data structures adds time and complexity to a computer's operation. Performing multiple lookups, especially when performed sequentially, to different data structures can have an especially adverse effect on system performance and efficiency. Depending on the nature of the data being retrieved, the data in different structures may be logically equivalent, e.g., the same value, but may be different because that data originated from a different source, e.g., a different user or identity.

DETAILED DESCRIPTION

Figure 1A:
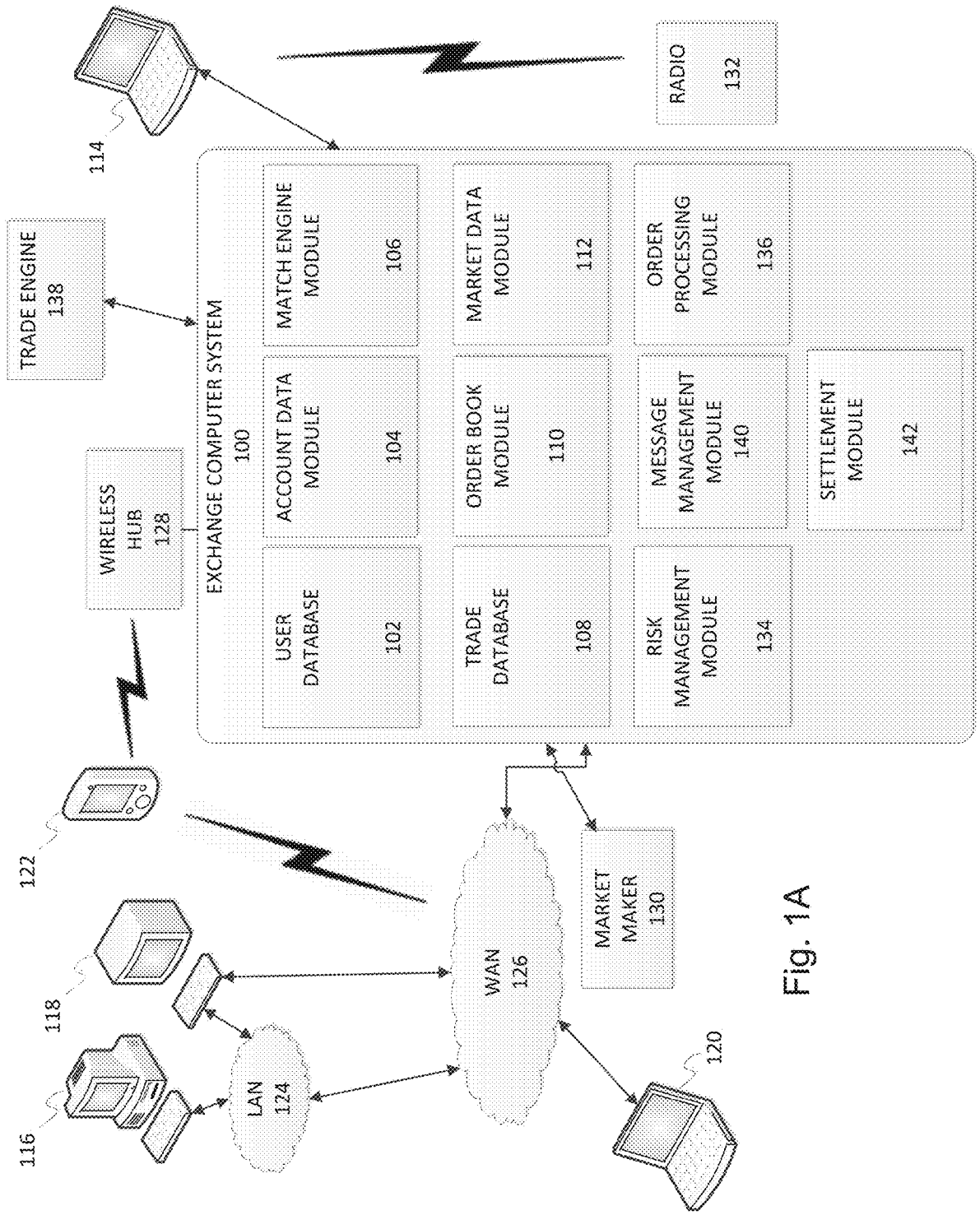
FIG. 1A depicts an illustrative computer network system that may be used to implement aspects of the disclosed embodiments.

When a computer's routine involves accessing data that can be utilized to complete a transaction, a computing system may have an option or choice to select which data structure to access and read. In some cases, different data structures may hold messages that are functionally equivalent, e.g., they instruct the computer to perform the same action at a same value, but are from different sources. The priority assigned to the different data structures and contents may influence which data is accessed first. The disclosed embodiments relate generally to systems and methods which match or otherwise allocate incoming messages with other existing messages stored in queues based on the characteristics of the messages, including characteristics such as the originating location of the messages, e.g., whether a message originated from an external source or was generated by combining two or more different messages.

A financial instrument trading system, such as a futures exchange, such as the Chicago Mercantile Exchange Inc. (CME), provides a contract market where financial instruments, e.g., futures and options on futures, are traded using electronic systems. An exchange may receive and process a large amount of orders, e.g., millions of orders per day. The exchange may prioritize orders based on pre-determined criteria. The criteria for prioritizing incoming orders can have a large impact on the overall speed and efficiency of the exchange system, and in particular the match engine processing the orders. The criteria for prioritizing incoming orders can also have an effect on the competitiveness and transparency at the exchange. Increasing speed, efficiency, competitiveness and transparency is desirable is in financial markets, and in particular, electronic financial exchanges, such as a futures exchange, such as the Chicago Mercantile Exchange Inc. (CME).

"Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

Current financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancelations, etc., in a manner as expected by the market participants, such as based on market data, e.g., prices, available counter-orders, etc., to provide an expected level of certainty that transactions will occur in a consistent and predictable manner and without unknown or unascertainable risks. In addition, it should be appreciated that electronic trading systems further impose additional expectations and demands by market participants as to transaction processing speed, latency, capacity and response time, while creating additional complexities relating thereto.

Electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

In one embodiment, if a participant wishes to modify a previously sent request, e.g., a prior order which has not yet been processed or traded, the participant may send a request message comprising a request to modify the prior request.

In one exemplary embodiment, the incoming request itself, e.g., the inbound order entry, may be referred to as an iLink message. iLink is a bidirectional communications/message protocol/message format implemented by the Chicago Mercantile Exchange Inc.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

In accordance with aspects of the disclosure, systems and methods are disclosed for aggregating quantities of resting orders. It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

In one embodiment, the disclosed embodiments relate to prioritization techniques used to match an incoming order with "resting," i.e., previously received but not yet matched (fully satisfied), orders, recognizing that the rules by which the incoming order is matched/allocated may affect the operation of the market or demand for the product being matched.

The disclosed systems and methods may be implemented to prioritize implied orders for options markets. For example, the disclosed embodiments increase matching and processing efficiency by altering the priority of a given resting implied order to match against an incoming order, relative to other suitably matching resting orders, as a function of the priority of the orders that are combined to generate the implied order.

It should be appreciated that the disclosed embodiments do not always prioritize real orders over implied orders. Thus, for example, customers submitting underlying orders that indirectly form an implied in a market have the same chance to be filled as customers submitting real orders that participate directly in the same market.

The disclosed embodiments also use order or message information as the basis for queuing orders to be matched. Thus, in one embodiment, the exchange computing system does not need to implement random or pre-defined tie-breaker rules that dictate which orders are matched first when the orders are almost identical. Instead, the exchange computing system can analyze the message information as disclosed herein to determine which messages should participate in a match event.

An exemplary trading network environment for implementing trading systems and methods is shown in FIG. 1A. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the example computer 200 described below with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described below.

An order processing module 136 may be included to decompose delta-based, spread instrument, bulk and other types of composite orders for processing by the order book module 110 and/or the match engine module 106. The order processing module 136 may also be used to implement one or more procedures related to clearing an order.

A message management module 140 may be included to, among other things, receive, and extract orders from, electronic messages as is indicated with one or more aspects of the disclosed embodiments. It should be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, the message management module 140, or other component of the exchange computer system 100.

In an embodiment, the message management module 140, as coupled with the order book module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure.

A settlement module 142 (or settlement processor or other payment processor) may be included to provide one or more functions related to settling or otherwise administering transactions cleared by the exchange. Settlement module 142 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 142 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 142 may be used to determine a mark to market amount on a daily basis during the term of the financial instrument. Such determinations may also be made on a settlement date for the financial instrument for the purposes of final settlement.

In some embodiments, the settlement module 142 may be integrated to any desired extent with one or more of the other modules or processors of the exchange computer system 100. For example, the settlement module 142 and the risk management module 134 may be integrated to any desired extent. In some cases, one or more margining procedures or other aspects of the margining mechanism(s) may be implemented by the settlement module 142.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described above, the disclosed embodiments may be implemented as a centrally accessible system or as a distributed system, e.g., where some of the disclosed functions are performed by the computer systems of the market participants.

The trading network environment shown in FIG. 1A includes exemplary computer devices 114, 116, 118, 120 and 122 which depict different exemplary methods or media by which a computer device may be coupled with the exchange computer system 100 or by which a user may communicate, e.g., send and receive, trade or other information therewith.

It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1A, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1A also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1A may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1A is merely an example and that the components shown in FIG. 1A may include other components not shown and be connected by numerous alternative topologies.

As shown in FIG. 1A, the exchange computer system 100 further includes a message management module 140 which may implement, in conjunction with the market data module 112, the disclosed mechanisms for managing electronic messages containing financial data sent between an exchange and a plurality of market participants, or vice versa. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

Figure 1B:
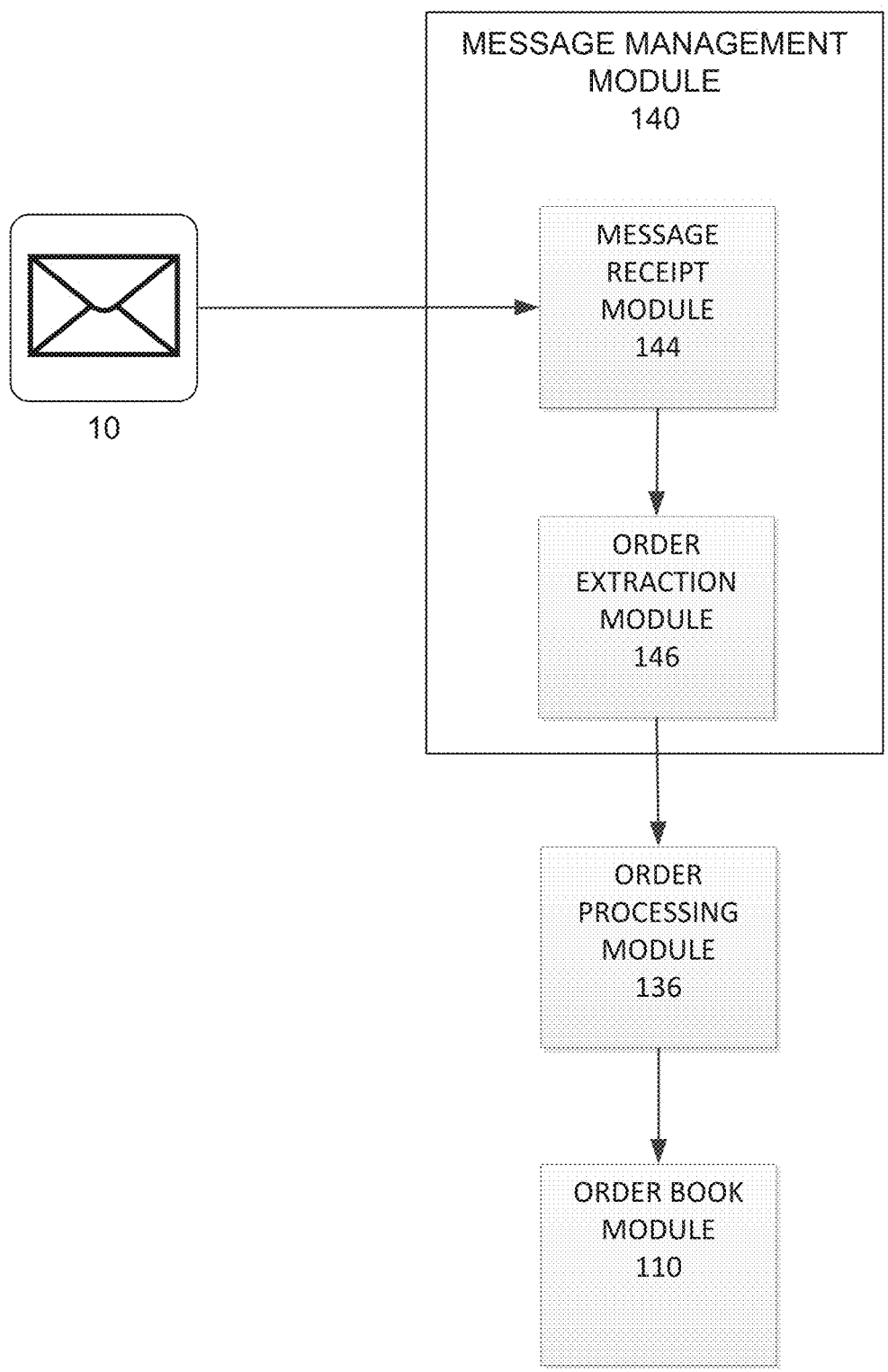
FIG. 1B depicts an example market order message management system that may be used to implement aspects of the disclosed embodiments.

FIG. 1B illustrates an embodiment of market order message management as implemented using the message management module 140 and order book module 110 of the exchange computer system 100. As such, a message 10 may be received from a market participant at the exchange computer system 100 by a message receipt module 144 of the message management module 140. The message receipt module 144 processes the message 10 by interpreting the content of the message based on the message transmit protocol, such as the transmission control protocol ("TCP"), to provide the content of the message 10 for further processing by the exchange computer system.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buy or sell) or time in force (e.g., a good until end of day order that is good for the full trading day, a good until canceled ordered that rests on the order book until matched, or a fill or kill order that is canceled if not filled immediately).

The order may be communicated from the order extraction module 146 to an order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 136 may be configured in various arrangements, and may be configured as part of the order book module 110, part of the message management module 140, or as an independent functioning module.

The disclosed embodiments may be implemented in a data transaction processing system that processes data items or objects. Customer or user devices (e.g., computers) may submit electronic data transaction request messages to the data transaction processing system over a data communication network. The electronic data transaction request messages may include, for example, transaction matching parameters, such as instructions or values, for processing the data transaction request messages within the data transaction processing system. The data transaction processing system may include a specifically configured matching processor that matches electronic data transaction request messages for the same one of the data items. The specifically configured matching processor may match electronic data transaction request messages based on multiple transaction matching parameters from the different client computers. The disclosed embodiments may be implemented to halt or release the matching processor depending on the state of the system and/or the contents of the electronic data transaction request messages.

Figure 2:
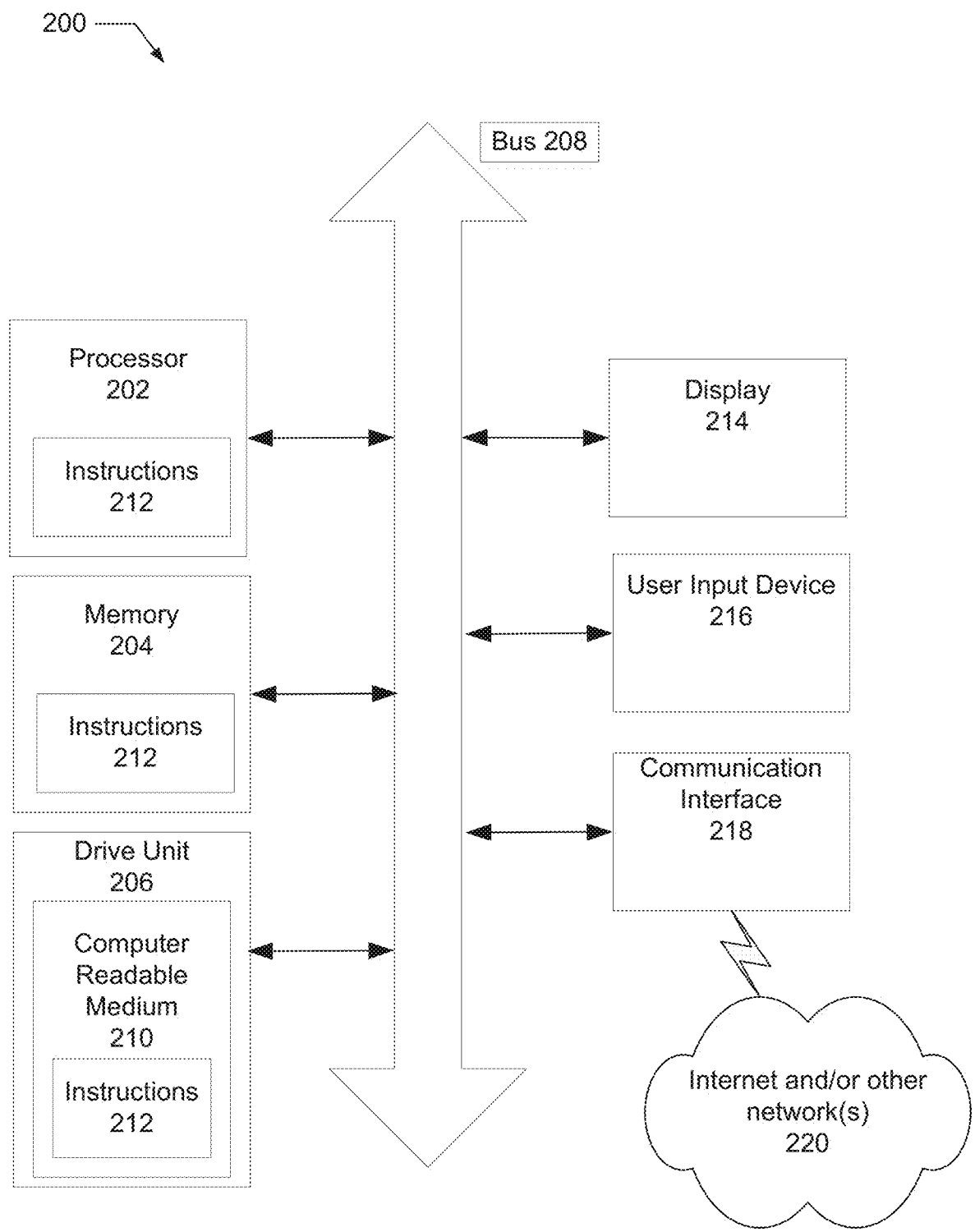
FIG. 2 depicts an illustrative embodiment of a general computer system for use with the disclosed embodiments.

Referring to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose/specifically configured microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

When applied to a financial exchange computer system, the embodiments described herein may utilize trade related electronic messages such as mass quote messages, individual order messages, modification messages, cancelation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX Binary, FIX/FAST, or by an exchange-provided API.

In an embodiment, a plurality of electronic messages is received from the network. The plurality of electronic message packets may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, the market may operate using characteristics that involve collecting orders over a period of time, such as a batch auction market. In such an embodiment, the period of time may be considered an order accumulation period. The period of time may involve a beginning time and an ending time, with orders placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an embodiment, the other data may be data indicating a particular time in which the action is to be executed. As such, the order may be considered a temporally specific order. The particular time in which an action is undertaken may be established with respect to any measure of absolute or relative time. In an embodiment, the time in which an action is undertaken may be established with reference to the beginning time of the time period or ending time of the time period in a batch auction embodiment. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example, the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an embodiment, the electronic message may also include other actions to be taken with respect to the order. These other actions may be actions to be executed after the initial or primary action associated with the order. For example, the actions may involve modifying or canceling an already placed order. Further, in an embodiment, the other data may indicate order modification characteristics. For example, the other data may include a price or volume change in an order. The other actions may involve modifying the already placed order to align with the order modification characteristics, such as changing the price or volume of the already placed order.

In an embodiment, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of official related to a product being bought or sold in the electronic market, and/or any other event or combination of events which may be detected by an electronic trading system.

In an embodiment, the action, or a primary action, associated with an order may be executed. For example, an order extracted from electronic message order characteristics may be placed into a market, or an electronic order book for a market, such that the order may be matched with other order counter thereto.

In an embodiment involving a market operating using batch auction principles, the action, such as placing the order, may be executed subsequent to the beginning time of the order accumulation period, but prior to the ending time of the order accumulation period. Further, as indicated above, a message may also include other information for the order, such as a particular time the action is to be executed. In such an embodiment, the action may be executed at the particular time. For example, in an embodiment involving a batch auction process having sub-periods during an order accumulation period, an order may be placed during a specified sub-period of the order accumulation period. The disclosed embodiments may be applicable to batch auction processing, as well as continuous processing.

Also, it may be noted that messages may be received prior or subsequent to the beginning time of an order accumulation period. Orders extracted from messages received prior to the beginning time may have the associated actions, or primary actions such as placing the order, executed at any time subsequent to the beginning time, but prior to the ending time, of the order accumulation period when no particular time for the execution is indicated in the electronic message. In an embodiment, messages received prior to the beginning time but not having a particular time specified will have the associated action executed as soon as possible after the beginning time. Because of this, specifying a time for order action execution may allow a distribution and more definite relative time of order placement so as to allow resources of the electronic trading system to operate more efficiently.

In an embodiment, the execution of temporally specific messages may be controlled by the electronic trading system such that a limited or maximum number may be executed in any particular accumulation period, or sub-period. In an embodiment, the order accumulation time period involves a plurality of sub-periods involving distinct temporal windows, a particular time indicated by a message may be indicative of a particular temporal window of the plurality of temporal windows, and the execution of the at least one temporally specific message is limited to the execution of a specified sub-period maximum number of temporally specific messages during a particular sub-period. The electronic trading system may distribute the ability to submit temporally specific message to selected market participants. For example, only five temporally specific messages may be allowed in any one particular period or sub-period. Further, the ability to submit temporally specific messages within particular periods or sub-periods may be distributed based on any technique. For example, the temporally specific messages for a particular sub-period may be auctioned off or otherwise sold by the electronic trading system to market participants. Also, the electronic trading system may distribute the temporally specific messages to preferred market participants, or as an incentive to participate in a particular market.

In an embodiment, an event occurrence may be detected. The event occurrence may be the occurrence of an event that was specified as other information relating to an order extracted from an electronic message. The event may be a triggering event for a modification or cancelation action associated with an order. The event may be detected subsequent to the execution of the first action when an electronic message further comprises the data representative of the event and a secondary action associated with the order. In an embodiment involving a market operating on batch auction principles, the event may be detected subsequent to the execution of a first action, placing an order, but prior to the ending time of an order accumulation period in which the action was executed.

In an embodiment, other actions associated with an order may be executed. The other actions may be any action associated with an order. For example, the action may be a conditional action that is executed in response to a detection of an occurrence of an event. Further, in a market operating using batch auction principles, the conditional action may be executed after the placement of an order during an order accumulation period, but in response to a detection of an occurrence of an event prior to an ending time of the order accumulation period. In such an embodiment, the conditional action may be executed prior to the ending time of the order accumulation period. For example, the placed order may be canceled, or modified using other provided order characteristics in the message, in response to the detection of the occurrence of the event.

An event may be a release of an economic statistic or a fluctuation of prices in a correlated market. An event may also be a perceptible change in market sentiment of a correlated market. A change may be perceptible based on a monitoring of orders or social media for keywords in reference to the market in question. For example, electronic trading systems may be configured to be triggered for action by a use of keywords during a course of ongoing public statements of officials who may be in a position to impact markets, such as Congressional testimony of the Chairperson of the Federal Reserve System.

The other, secondary, or supplemental action may also be considered a modification of a first action executed with respect to an order. For example, a cancelation may be considered a cancelation of the placement of the order. Further, a secondary action may have other data in the message which indicates a specific time in which the secondary action may be executed. The specific time may be a time relative to a first action, or placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described above with respect to FIG. 2. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming order may also be saved. The data may be stored in any device, or using any technique, operable to store and provide recovery of data. For example, a memory 204 or computer readable medium 210, may be used to store data, as is described above with respect to FIG. 2. The acts of the process as described herein may also be repeated. As such, data for multiple received transactions for multiple market participants may be stored and used as describe herein.

The order processing module 136 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 710, as associated with particular market participants.

Also, the order processing module 136 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 136 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. This priority may be determined using various techniques. For example, orders that were indicated by messages received earlier in time may receive a higher priority to match than orders that were indicated by subsequently received messages. Also, scoring or grading of the characteristics may provide for priority determination instead of or in addition to order/time of receipt. Data indicative of order matches may be stored by a match engine and/or an order processing module 136, and used for determining MQI scores of market participants.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The disclosed embodiments recognize that electronic messages such as incoming messages from market participants, i.e., "outright" messages, e.g., trade order messages, etc., are sent from client devices associated with market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market.

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. Financial messages communicated to the electronic trading system, also referred to as "inbound" messages, may include associated actions that characterize the messages, such as trader orders, order modifications, order cancelations and the like, as well as other message types. Financial messages communicated from the electronic trading system, referred to as "outbound" messages, may include messages responsive to inbound messages, such as confirmation messages, or other messages such as market update messages, quote messages, and the like.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

In the exemplary embodiments, all transactions for a particular market may be ultimately received at the electronic trading system via one or more points of entry, e.g., one or more communications interfaces, at which the disclosed embodiments apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see U.S. patent application Ser. No. 14/074,675, filed on Nov. 7, 2013, published as U.S. patent application Publication Ser. No. U.S. Patent Publication No. 2015/0127516, entitled "Transactionally Deterministic High Speed Financial Exchange Having Improved, Efficiency, Communication, Customization, Performance, Access, Trading Opportunities, Credit Controls, And Fault Tolerance", the entirety of which is incorporated by reference herein and relied upon.

In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple MSGs, one for each market/product implemented thereby.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

Upon receipt of an incoming order to trade in a particular financial instrument, whether for a single-component financial instrument, e.g., a single futures contract, or for a multiple-component financial instrument, e.g., a combination contract such as a spread contract, a match engine, as will be described in detail below, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all). Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data, as was described above, reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price.

The exchange computer system, as will be described below, monitors incoming orders received thereby and attempts to identify, i.e., match or allocate, as will be described in more detail below, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

Upon identification (matching) of a contra order(s), a minimum of the quantities associated with the identified order and the incoming order is matched and that quantity of each of the identified and incoming orders become two halves of a matched trade that is sent to a clearinghouse. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy or higher if the incoming order is a sell, than the price of the incoming order, the exchange computer system may allocate the quantity of the incoming order among such identified orders in accordance with the matching algorithms as, for example, may be defined in the specification of the particular financial product or defined by the exchange for multiple financial products.

As was noted above, an exchange must respond to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include:
 Price Explicit Time
 Order Level Pro Rata
 Order Level Priority Pro Rata
 Preference Price Explicit Time
 Preference Order Level Pro Rata
 Preference Order Level Priority Pro Rata
 Threshold Pro-Rata
 Priority Threshold Pro-Rata
 Preference Threshold Pro-Rata
 Priority Preference Threshold Pro-Rata
 Split Price-Time Pro-Rata For example, the Price Explicit Time trading policy is based on the basic Price Time trading policy with Explicit Orders having priority over Implied Orders at the same price level. The order of traded volume allocation at a single price level may therefore be:

Explicit order with oldest timestamp first. Followed by

Any remaining explicit orders in timestamp sequence (First In, First Out—FIFO) next. Followed by Implied order with oldest timestamp next. Followed by Any remaining implied orders in timestamp sequence (FIFO).

In Order Level Pro Rata, also referred to as Price Pro Rata, priority is given to orders at the best price (highest for a bid, lowest for an offer). If there are several orders at this best price, equal priority is given to every order at this price and incoming business is divided among these orders in proportion to their order size. The Pro Rata sequence of events is:

1. Extract all potential matching orders at best price from the order book into a list.

2. Sort the list by order size, largest order size first. If equal order sizes, oldest timestamp first. This is the matching list.

3. Find the 'Matching order size, which is the total size of all the orders in the matching list.

4. Find the 'tradable volume', which is the smallest of the matching volume and the volume left to trade on the incoming order.

5. Allocate volume to each order in the matching list in turn, starting at the beginning of the list. If all the tradable volume gets used up, orders near the end of the list may not get allocation.

6. The amount of volume to allocate to each order is given by the formula:

(Order volume/Matching volume)*Tradable volume

The result is rounded down (for example, 21.99999999 becomes 21) unless the result is less than 1, when it becomes 1.

7. If tradable volume remains when the last order in the list had been allocated to, return to step 3.

Note: The matching list is not re-sorted, even though the volume has changed. The order which originally had the largest volume is still at the beginning of the list.

8. If there is still volume left to trade on the incoming order, repeat the entire algorithm at the next price level.

Order Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is:

1. Extract all potential matching orders at best price from the order book into a list.

2. Sort the list by explicit time priority, oldest timestamp first. This is the matching list.

3. Find the 'Matching volume', which is the total volume of all the orders in the matching list.

4. Find the 'tradable volume', which is the smallest of the matching volume and the volume left to trade on the incoming order.

5. Allocate volume to each order in the matching list in turn, starting at the beginning of the list.

6. The amount of volume to allocate to each order is given by the formula:

(Order volume/Matching volume)*Tradable volume

The result is rounded down to the nearest lot (for example, 21.99999999 becomes 21) unless the result is less than the defined threshold in which case it is rounded down to 0.

7. If tradable volume remains when the last order in the list had been allocated to, the remaining volume is allocated in time priority to the matching list.

8. If there is still volume left to trade on the incoming order, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99. (A percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and may be the entire incoming volume. The Price Time Volume is allocated to resting orders in strict time priority. Any remaining incoming volume after the Price Time Volume has been allocated will be allocated according to the respective Threshold Pro-Rata algorithm. The sequence of allocation, at each price level, is therefore:

1. Priority order, if applicable
2. Preference allocation, if applicable
3. Price Time allocation of the configured percentage of incoming volume
4. Threshold Pro-Rata allocation of any remaining incoming volume
5. Final allocation of any leftover lots in time sequence.

Any resting order may receive multiple allocations from the various stages of the algorithm.

It will be appreciated that there may be other allocation algorithms, including combinations of algorithms, now available or later developed, which may be utilized with the disclosed embodiments, and all such algorithms are contemplated herein. In one embodiment, the disclosed embodiments may be used in any combination or sequence with the allocation algorithms described herein.

One exemplary system for matching is described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon, discloses an adaptive match engine which draws upon different matching algorithms, e.g., the rules which dictate how a given order should be allocated among qualifying resting orders, depending upon market conditions, to improve the operation of the market. For example, for a financial product, such as a futures contract, having a future expiration date, the match engine may match incoming orders according to one algorithm when the remaining time to expiration is above a threshold, recognizing that during this portion of the life of the contract, the market for this product is likely to have high volatility. However, as the remaining time to expiration decreases, volatility may decrease. Accordingly, when the remaining time to expiration falls below the threshold, the match engine switches to a different match algorithm which may be designed to encourage trading relative to the declining trading volatility. Thereby, by conditionally switching among matching algorithms within the same financial product, as will be described, the disclosed match engine automatically adapts to the changing market conditions of a financial product, e.g., a limited life product, in a non-preferential manner, maintaining fair order allocation while improving market liquidity, e.g., over the life of the product.

In one implementation, this trading system may evaluate market conditions on a daily basis and, based thereon, change the matching algorithm between daily trading sessions, i.e., when the market is closed, such that when the market reopens, a new trading algorithm is in effect for the particular product. As will be described, the disclosed embodiments may facilitate more frequent changes to the matching algorithms so as to dynamically adapt to changing market conditions, e.g., intra-day changes, and even intra-order matching changes. It will be further appreciated that hybrid matching algorithms, which match part of an order using one algorithm and another part of the order using a different algorithm, may also be used.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described above, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

As described above, matching systems apply a single algorithm, or combined algorithm, to all of the orders received for a particular financial product to dictate how the entire quantity of the incoming order is to be matched/allocated. In contrast, the disclosed embodiments may apply different matching algorithms, singular or combined, to different orders, as will be described, recognizing that the allocation algorithms used by the trading host for a particular market may, for example, affect the liquidity of the market. Specifically, some allocation algorithms may encourage traders to submit more orders, where each order is relatively small, while other allocation algorithms encourage traders to submit larger orders. Other allocation algorithms may encourage a trader to use an electronic trading system that can monitor market activity and submit orders on behalf of the trader very quickly and without intervention. As markets and technologies available to traders evolve, the allocation algorithms used by trading hosts must also evolve accordingly to enhance liquidity and price discovery in markets, while maintaining a fair and equitable market.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly} = \text{Leg1} - 2 \times \text{Leg2} + \text{Leg3} \quad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

As was described above, the financial instruments which are the subject of the orders to trade, may include one or more component financial instruments. Each financial instrument may have its own order book, i.e., market, in which it may be traded. In some cases, a financial instrument may have more than one component financial instrument, and those component financial instruments may further have their own order books in which they may be traded. Accordingly, when an order for a financial instrument is received, it may be matched against a suitable counter order in its own order book or, possibly, against a combination of suitable counter orders in the order books of the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and a suitable match cannot be found in the A order book, it may be possible to match order for A against a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments.

The order for a particular financial instrument actually received from a market participant, whether it comprises one or more component financial instruments, is referred to as a "real" or "outright" order, or simply as an outright. The one or more orders which must be synthesized into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implied matching", the identified orders being referred to as an "implied match." Depending on the number component financial instruments involved, and whether those component financial instruments further comprise component financial instruments of their own, there may be numerous different implied matches identified which would allow the incoming order to be at least partially matched and mechanisms may be provided to arbitrate among them, such as by picking the implied match comprising the least number of component financial instruments or the least number of synthesized orders.

Upon receipt of an incoming order, or thereafter, the identification or derivation of a combination of one or more suitable counter orders which have not actually been received but if they were received, would allow at least a partial trade of the incoming order to be executed, is referred to as an "implied opportunity." As with implied matches, there may be numerous implied opportunities identified for a given incoming order. Implied opportunities are advertised to the market participants, such as via suitable synthetic orders, e.g., counter to the desired order, being placed on the respective order books to rest (or give the appearance that there is an order resting) and presented via the market data feed to appear available to trade in order to solicit the desired orders from the market participants. Depending on the number component financial instruments involved, and whether those component financial instruments further comprise component financial instruments of their own, there may be numerous implied opportunities, the submission thereof, would allow the incoming order to be at least partially matched.

Implied opportunities, e.g., the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the exchange will benefit from increased transaction volume. However, identifying implied opportunities may be computationally intensive. In a high performance trading system where low transaction latency is important, it may be important to identify and advertise implied opportunities quickly so as to improve or maintain market participant interest and/or market liquidity.

For example, exchange computer system 100 may derive, identify and/or advertise, publish, display or otherwise make available for trading orders based on outright orders. For example, two different outright orders may be resting on the books, or be available to trade or match. The orders may be resting because there are no outright orders that match the resting orders. Thus, each of the orders may wait or rest on the books until an appropriate outright counteroffer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying legs.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs. Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

Figure 3A:
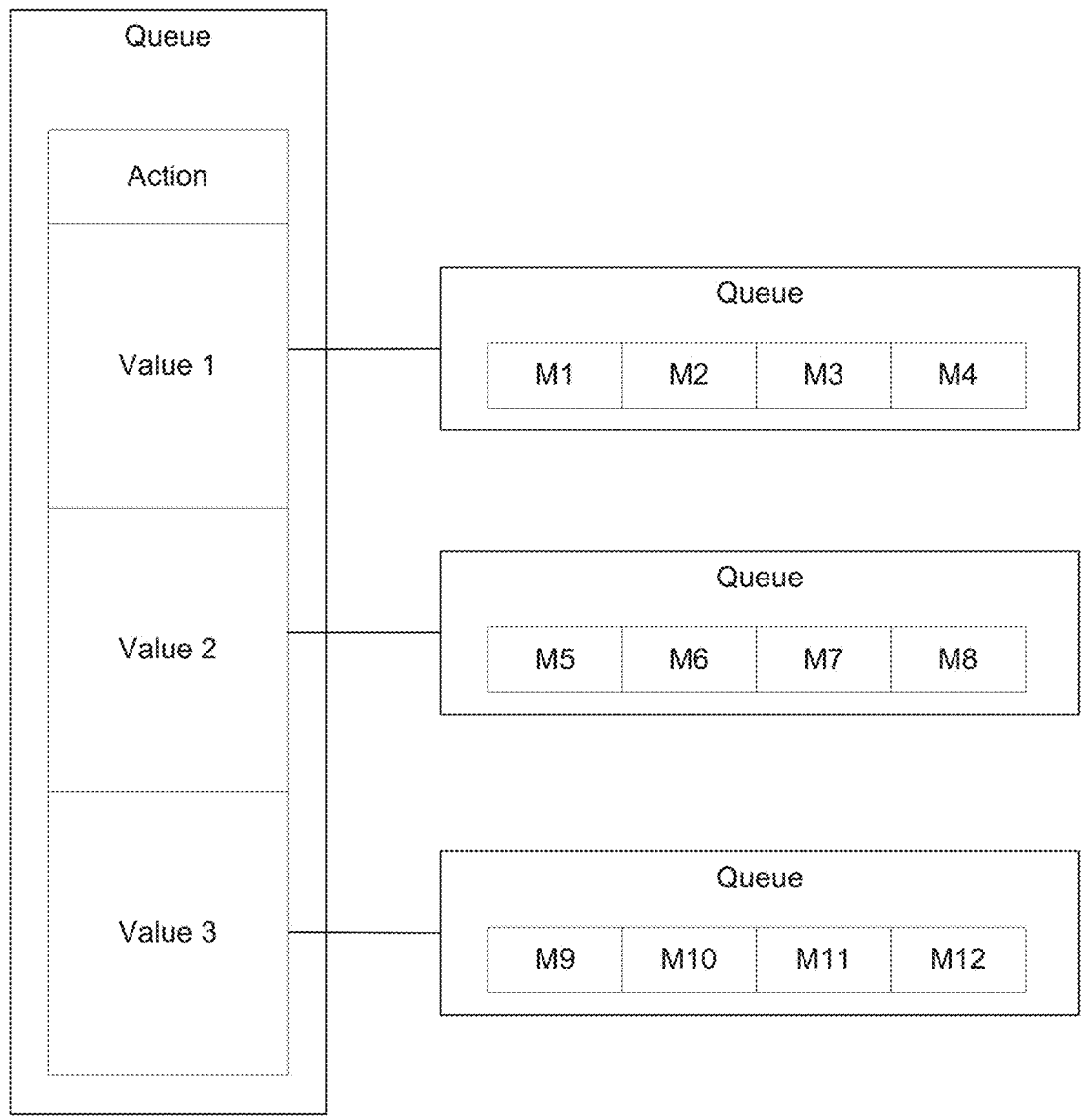
FIG. 3A depicts an illustrative embodiment of a data structure used to implement aspects of the disclosed embodiments.

In one embodiment, the messages and/or values received for each object may be stored in queues according to the priority techniques disclosed herein. FIG. 3A illustrates an example data structure 300 for storing and retrieving messages related to different values for the same action for an object. For example, data structure 300 may be a set of queues or linked lists for multiple values for an action, e.g., bid, on an object. It should be appreciated that the system may store multiple values for the same action for an object, for example, because multiple users submitted messages to buy specified quantities of an object at different values. Thus, in one embodiment, the exchange computing system can keep track of different orders or messages for buying or selling quantities of objects at specified values.

Although the application contemplates queues storing messages, the implementation may involve additional pointers or linking to other data structures. Thus, in one embodiment, each queue may store different values, which could represent prices, where each value points to or is linked to the messages (which may themselves be stored in queues and sequenced according to priority techniques disclosed herein) that will match at that value. For example, as shown in FIG. 3A, all of the values relevant to executing an action at different values for an object are stored in a queue. Each value in turn points to, e.g., a linked list or queue logically associated with the values. The linked list stores the messages that instruct the exchange computing system to buy specified quantities of the object at the corresponding value.

The sequence of the messages in the message queues connected to each value may be determined by the priority techniques discussed herein. For example, in FIG. 3A, messages M1, M2, M3 and M4 are associated with performing an action (e.g., buying or selling) a certain number of units (may be different for each message) at Value 1. M1 has priority over M2, which has priority over M3, which has priority over M4. Thus, if a counter order matches at Value 1, the system fills as much quantity as possible associated with M1 first, then M2, then M3, and then M4.

Figure 3B:
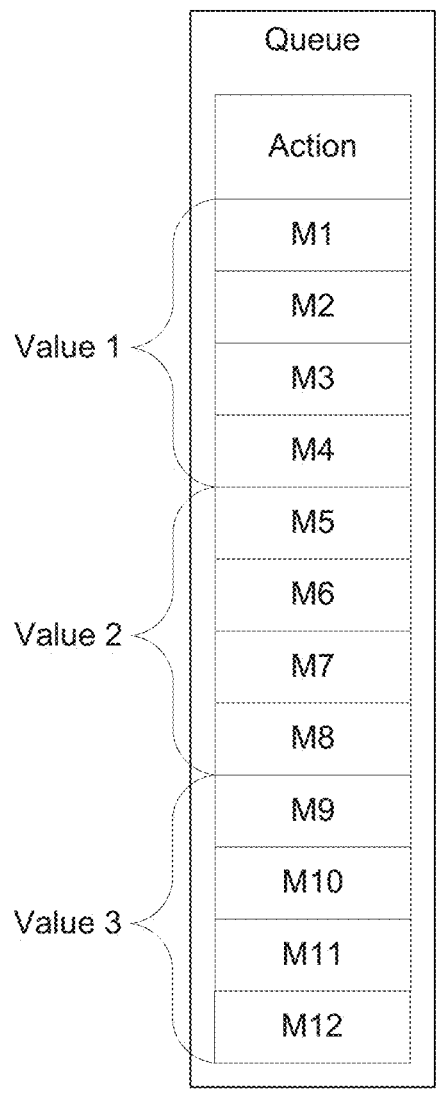
FIG. 3B depicts an illustrative embodiment of an alternative data structure used to implement aspects of the disclosed embodiments.

FIG. 3B illustrates an example alternative data structure 350 for storing and retrieving messages and related values. It should be appreciated that matches occur based on values, and so all the messages related to a given value may be prioritized over all other messages related to a different value. As shown in FIG. 3B, the messages may be stored in one queue and grouped by values according to the hierarchy of the values. The hierarchy of the values may depend on the action to be performed. For example, if a queue is a sell queue (e.g., the Action is Sell), the lowest values may be given the best priority and the highest values may be given the lowest priority. Thus, as shown in FIG. 3B, if Value 1 is lower than Value 2 which is lower than Value 3, the Value 1 messages may be prioritized over Value 2 messages, which in turn are prioritized over Value 3 messages. Within Value 1, M1 is prioritized over M2, which in turn is prioritized over M3, which in turn is prioritized over M4. Within Value 2, M5 is prioritized over M6, which in turn is prioritized over M7, which in turn is prioritized over M8. Within Value 3, M9 is prioritized over M10, which in turn is prioritized over M11, which in turn is prioritized over M12.

Alternatively, the messages may be stored in a tree-node data structure that defines the priorities of the messages. In one embodiment, the messages may make up the nodes.

In the illustrated examples, the message with the best priority may be illustrated as being in the topmost position in a queue, although the system may be configured to place the best priority message in some other predetermined position.

In one embodiment, the system may traverse through a number of different values and associated messages using the disclosed methods in response to one incoming message. In particular, referring to FIG. 3B, if the queue is for selling an object for the listed Values 1, 2 and 3 (where Value 1 is lower than Value 2 which is lower than Value 3), and if the system receives an incoming aggressing order to buy quantity X at a Value 4 that is greater than Values 1, 2, and 3, the system will fill as much of quantity X as possible by first traversing through the messages under Value 1 (in sequence M1, M2, M3, M4). If any of the quantity of X remains, the system traverses down the prioritized queue until all of the incoming order is filled (e.g., all of X is matched) or until all of the quantities of M1 through M12 are filled. Any remaining, unmatched quantity remains on the books, e.g., as a resting order.

The system may traverse the queues and check the values in a queue, and upon finding the appropriate value, may locate the messages involved in making that value available to the system. When an outright message value is stored in a queue, and when that outright message is involved in a trade or match, the system may check the queue for the value, and then may check the data structure storing messages associated with that value.

As described herein, the exchange computing system may combine multiple orders or messages to generate implied messages. A constituent message as used herein is a message that is used or combined with other messages to generate an implied message. For example, if two outright messages are combined to generate an implied message, the outright messages are constituent messages. In one embodiment, the objects whose messages can be combined to generate an implied message may be referred to as "constituent objects".

It should be appreciated that a constituent message may be a message for an individual contract or a message for a spread contract. When an implied message is involved in a trade or match, the system may need to communicate with, e.g., update, the data structures storing information regarding the constituent messages associated with that implied message. In one embodiment, an implied message points to or is linked to at least two constituent messages that are combined to generate the implied message. When an implied message is involved in a trade or match, the system performs at least two different lookups to, or data reads from, the data structures holding the constituent messages.

In one embodiment, outright message values stored in a queue may hold pointers to the outright messages that generated that value. Thus, even matching an outright message value may involve at least one lookup.

The number of lookups or read access or data reads from data structures can limit the overall system speed and performance. For example, if thousands or millions of data lookups are performed in one day, as may be done, for example, during one day of trading at the exchange, the overall impact of techniques that attempt to reduce the number of data lookups can be beneficial to the overall system.

A system may depend on certain rules, logic, and inter-related objects and data. In technical and computing environments, a system may calculate values for multiple objects subject to rules, e.g., business or environment logic, associated with the objects. Certain object types may also depend on other object types. For example, a computing environment may include multiple objects of different types, e.g., base objects and composite objects. A composite object as used herein is an object whose value depends on, is related to, or is influenced by, the values of other objects, such as base objects or other composite objects. For example, a composite object may involve transactions between multiple, e.g., two, base objects. Or, a composite object may define a relationship between other objects. Thus, composite objects depend on the values of other system objects. In one embodiment, a composite object involves or defines a transaction or relationship between at least two other objects. For example, a composite object involves or defines a transaction or relationship between two base objects.

In one embodiment, an exchange computing system may convert all financial instruments to objects. In one embodiment, an object may represent the order book for a financial instrument. Moreover, in one embodiment, an object may be defined by two queues, one queue for each action that can be performed by a user on an object. For example, an order book converted to an object may be represented by an Ask queue and a Bid queue. Resting messages or orders associated with the respective financial instrument may be stored in the appropriate queue and recalled therefrom according to the priority techniques disclosed herein.

In one embodiment, an exchange computer system may convert contracts or legs to base objects, and may convert spread instruments to composite objects.

In one embodiment, the disclosed embodiments provide systems and methods that prioritize messages associated with objects in specific ways depending on the characteristics of the various messages and the states of the various objects in memory. For example, a system may hold certain resting messages in queue until the message is to be processed, e.g., the message is involved in a match. The order, sequence or priority given to messages may depend on the characteristics of the message. For example, in certain environments, messages may indicate an action that a computer in the system should perform. Actions may be complementary actions, or require more than one message to complete. For example, a system may be tasked with matching messages or actions contained within messages. The messages that are not matched may be queued by the system in a data queue or other structure, e.g., a data tree having nodes representing messages or orders.

The queues are structured so that the messages are stored in sequence according to priority. Although the embodiments are disclosed as being implemented in queues, it should be understood that different data structures such as for example linked lists or trees may also be used.

The system may include separate data structures, e.g., queues, for different actions associated with different objects within the system. For example, in one embodiment, the system may include a queue for each possible action that can be performed on an object. The action may be associated with a value. The system prioritizes the actions based in part on the associated value.

Figure 4:
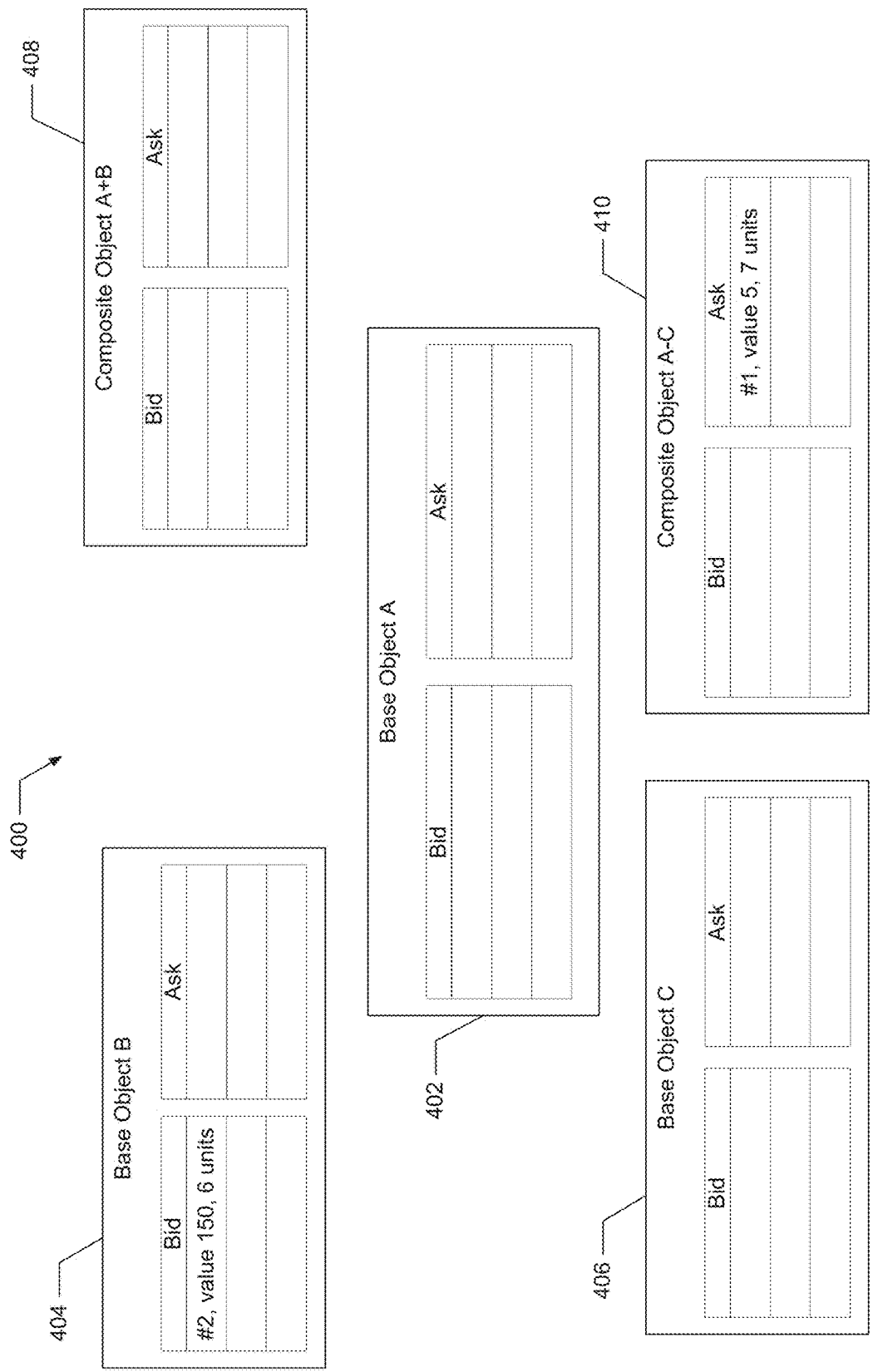
FIG. 4 depicts an illustrative embodiment of data structures holding example messages used to implement aspects of the disclosed embodiments.

For example, as shown in FIG. 4, the order book module of a computing system may include several paired queues, such as queues Bid and Ask for each object. The system may include two queues, or one pair of queues, for each object that is matched or processed by the system. In one embodiment, the system stores messages in the queues that have not yet been matched or processed. FIG. 4 may be an implementation of the data structures disclosed in FIGS. 3A and/or 3B.

The queues may define the priority or sequence in which messages are processed upon a match event. For example, two messages stored in a queue may represent performing the same action at the same value. When a third message is received by the system that represents a matching action at the same value, the system may need to select one of the two waiting, or resting, messages as the message to use for a match. Thus, when multiple messages can be matched at the same value, the exchange may have a choice or some flexibility regarding the message that is matched. The queues may define the priority in which orders that are otherwise equivalent (e.g., same action for the same object at the same value) are processed.

As shown in FIG. 4, example system 400 may include multiple objects, such as five different objects, namely base object A 402, base object B 404, base object C 406, composite object A+B 408, and composite object A-C 410. The system may include a pair of queues for each object, e.g., a bid and ask queue for each object. Each queue may be for example implemented utilizing the data structure of FIG. 3B. The exchange may be able to specify the conditions upon which a message for an object should be placed in a queue. For example, the system may include one queue for each possible action that can be performed on an object. The system may be configured to process messages that match with each other. In one embodiment, a message that indicates performing an action at a value may match with a message indicating performing a corresponding action at the same value. Or, the system may determine the existence of a match when messages for the same value exist in both queues of the same object.

The messages may be received from the same or different users or traders.

The queues illustrated in FIG. 4 hold or store messages received by a computing exchange, e.g., messages submitted by a user to the computing exchange, and waiting for a proper match. It should be appreciated that the queues may also hold or store implieds, e.g., implied messages generated by the exchange system, such as messages implied in or implied out as described herein. The system thus adds messages to the queues as they are received, e.g., messages submitted by users, or generated, e.g., implied messages generated by the exchanges. The sequence or prioritization of messages in the queues is based on information about the messages and the overall state of the various objects in the system.

Each outright message is assigned a priority number based on when that message was submitted by a user to the exchange. Each implied order is assigned the highest priority number of the messages that make up the implied.

Figure 5:
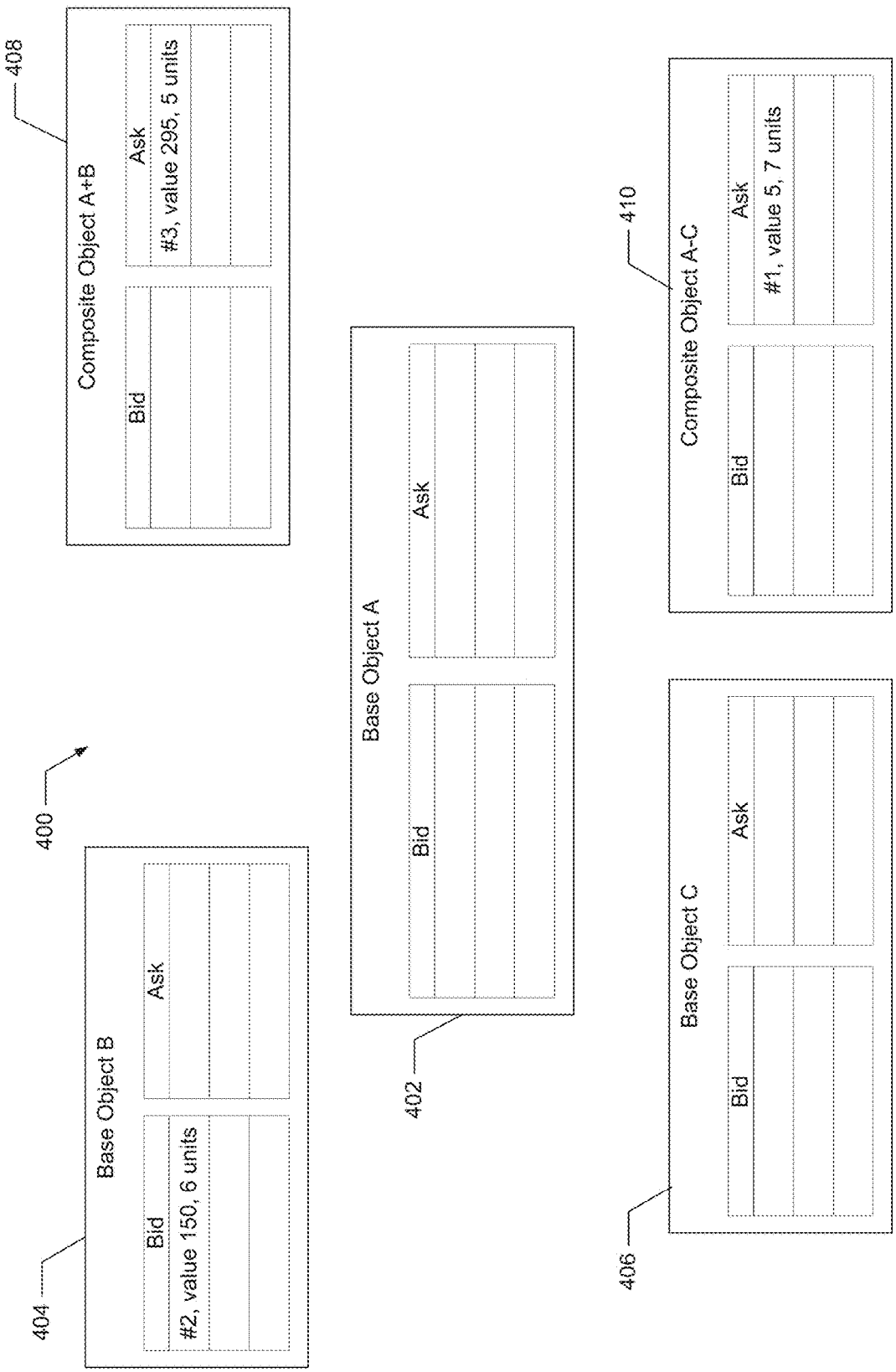
FIG. 5 depicts another illustrative embodiment of data structures holding example messages used to implement aspects of the disclosed embodiments.

As messages are received by the example system of FIG. 4, resting messages are stored in the appropriate queues of FIG. 4. For example, as shown in FIG. 4, the system may receive a message having priority number 1 (indicated in FIG. 4 as #1) to sell 7 units of composite object A-C 410 at a value of 5, and the system may also receive a message having priority number 2 to buy 6 units of object B 404 at a value of 150. None of messages numbered 1 or 2 implies any messages for any of the other objects. The system then receives a message having priority number 3 to sell 5 units of composite object A+B 408 at a value of 295. As shown in FIG. 5, a message having priority 3 is entered into the appropriate queue.

Figure 6:
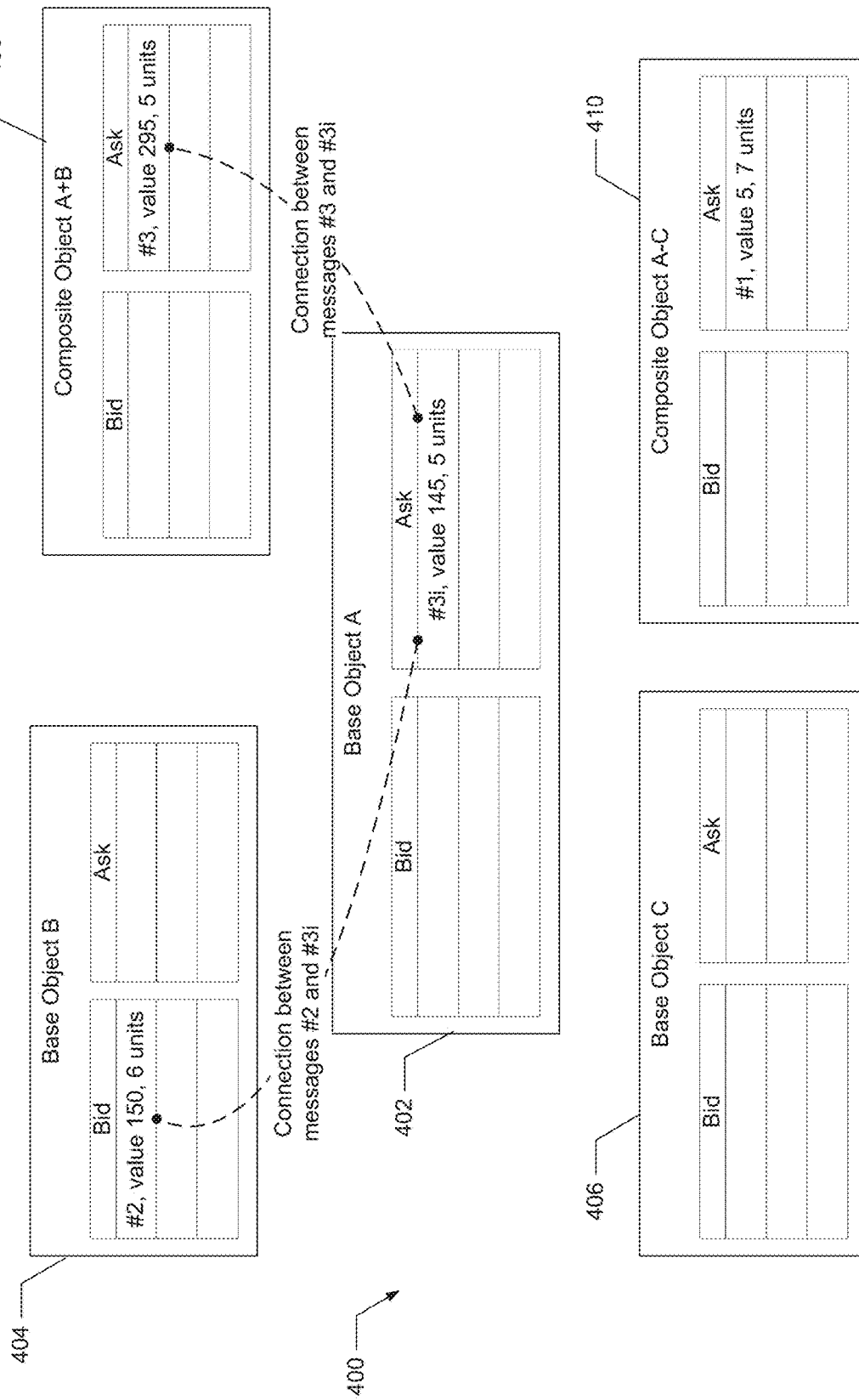
FIG. 6 depicts yet another illustrative embodiment of data structures holding example messages used to implement aspects of the disclosed embodiments.

The entry of message 3 allows the exchange computing system to imply an implied message into base object A 402. In particular, as shown in FIG. 6, the exchange uses messages 2 and 3 to generate an implied message to sell 5 units of object A 402 at a value of 145. Moreover, the system assigns a priority to an implied message that is the latest of the priorities of the messages making up the implied message. Thus, the implied message based on messages 2 and 3 has a priority number 3 (indicated in FIG. 6 as #3*i*). The system also tracks the messages that were used to generate the implied message. In one embodiment, the system may implement logical connections between implied messages stored in queues and other constituent messages from other queues combined to generate the implied messages. As highlighted in FIG. 6 via dashed lines, the message indicated by #3*i* was implied due to a combination of message 2 under object B 404 and message 3 under object A+B 408.

Although FIG. 6 illustrates two messages combining to generate an implied message, the disclosed embodiments may be applicable to systems and trading environments where more than two, e.g., three, messages are combined to generate an implied message. For example, a message for a butterfly spread instrument may be combined with two other messages to imply an implied message. Thus, the disclosed embodiments are scalable in terms of how many messages or markets are combined to generate an implied order.

Figure 7:
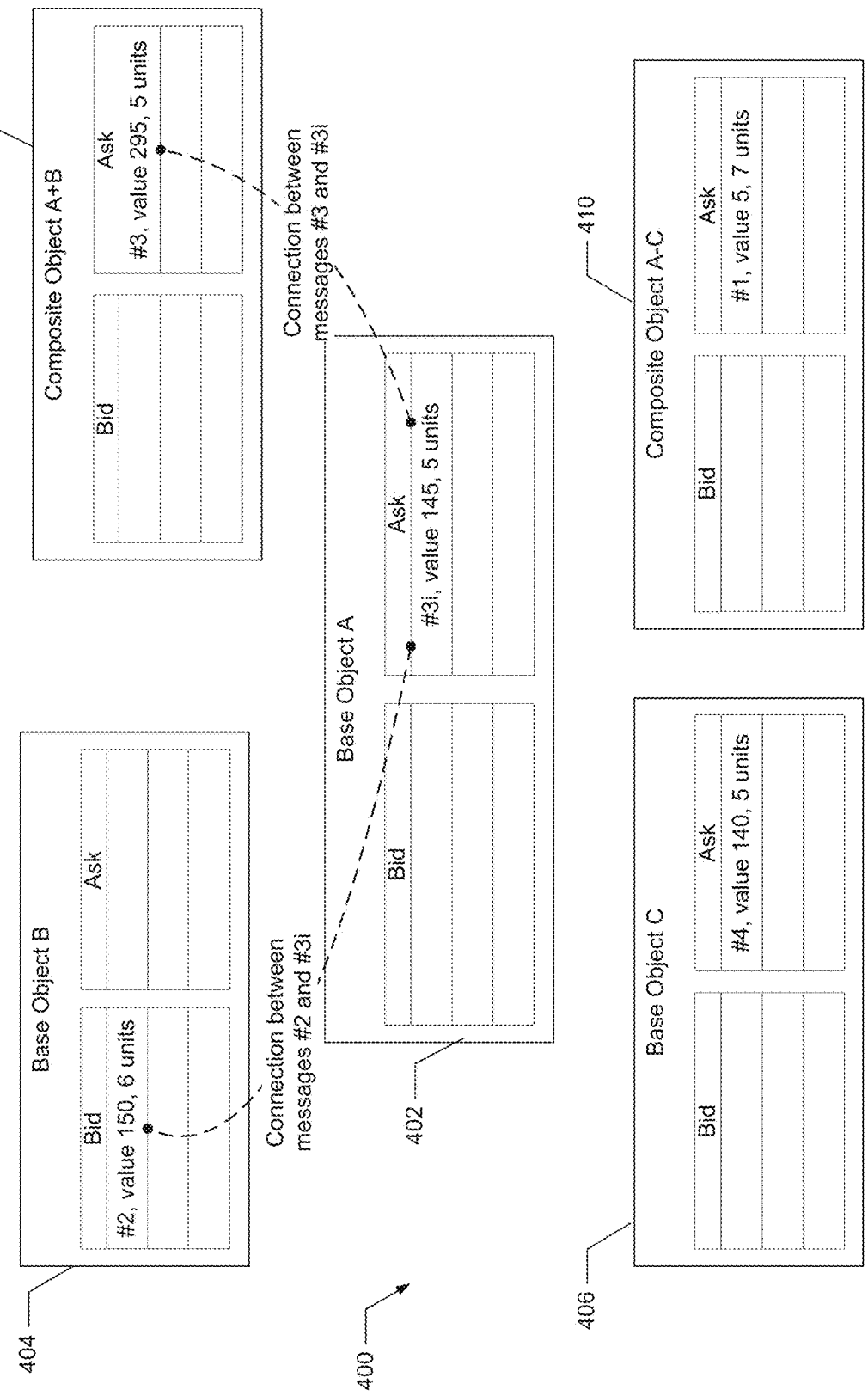
FIG. 7 depicts another illustrative embodiment of data structures holding example messages used to implement aspects of the disclosed embodiments.
Figure 8:
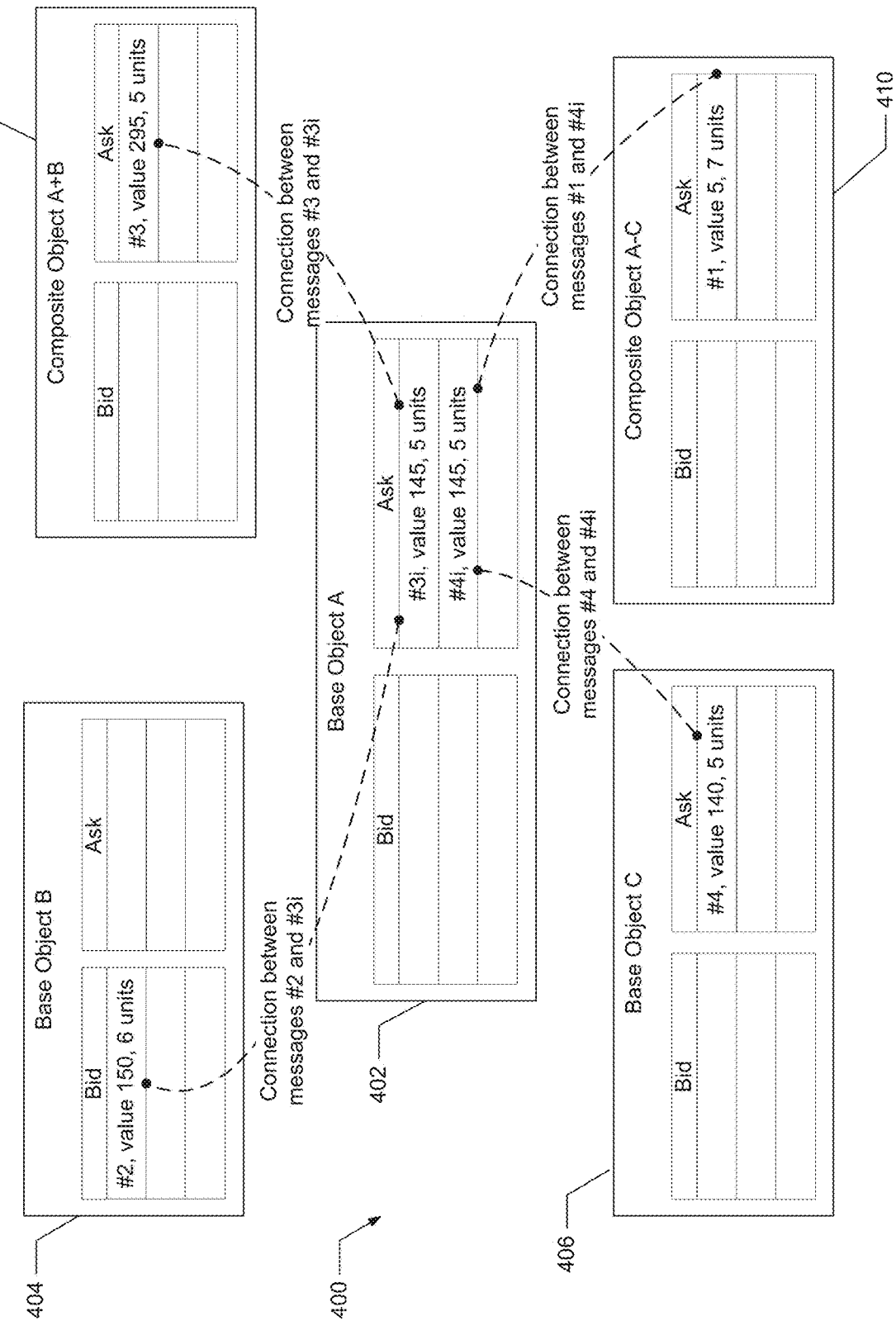
FIG. 8 depicts yet another illustrative embodiment of data structures holding example messages used to implement aspects of the disclosed embodiments.

Next, the system receives a message having priority number 4 to sell 5 units of object C 406 at a value of 140. As shown in FIG. 7, the system enters message 4 into the appropriate queue. The entry of message 4 allows the exchange computing system to imply an implied message into base object A 402. In particular, as shown in FIG. 8, the exchange uses messages 1 and 4 to generate an implied message to sell 5 units of object A 402 at a value of 145. Moreover, the implied message based on messages 1 and 4 has a priority number 4 (indicated in FIG. 8 as #4*i*). The system also tracks the messages that were used to generate the implied message. As highlighted in FIG. 8 via dashed lines, the message indicated by #4*i* was implied due to a combination of message 1 under object A-C 410 and message 4 under object C 406.

Figure 9:
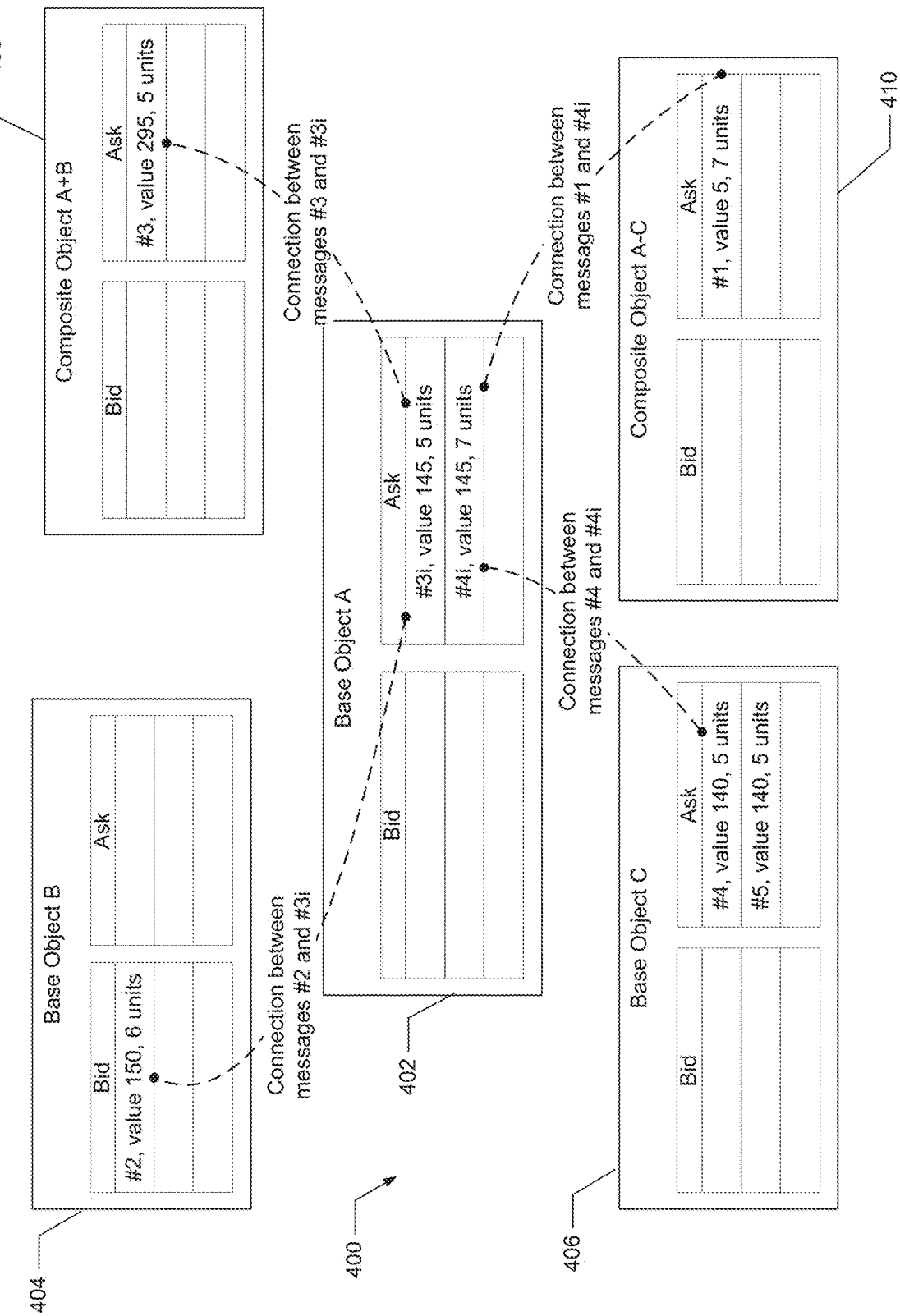
FIG. 9 depicts another illustrative embodiment of data structures holding example messages used to implement aspects of the disclosed embodiments.

The system next receives a message having priority number 5 to sell 5 units of object C 406 at a value of 140. As shown in FIG. 9, the system enters message 5 into the appropriate queue. It should be appreciated that because of the additional 5 units of object C 406 received via message 5, 2 units of objects C can be combined with the 2 unused units of object A-C 410 from message 1 to imply 2 units of object A 402. However, instead of generating a new implied message having priority 5*i* (5 being the later of the two priorities, 1 and 5, used to imply the additional 2 units of object A 402), the system aggregates the 2 additional units of object A 402 with the 5 units of object A 402 already implied in message 4*i*. Thus, the quantity or number of units in message 4*i* is increased by 2 units, from 5 units to 7 units.

Thus, it should be appreciated that the priority assigned to an implied message is derived from the individual priorities of that implied message's component messages. In one embodiment, the later of the component message priorities may be assigned to the implied message. Alternatively, the earlier of the component message priorities may be assigned to the implied message.

In one embodiment, the system may analyze the relationships between objects to determine which objects are possible sources of liquidity for a given object. In one embodiment, the system may identify all the possible sources for a message for an object. For example, referring to FIG. 4, the system may identify the combination of base object B 404 and composite object A+B 408 as one source for implying messages into base object A 402, and the system may identify the combination of base object C 406 and composite object A-C 410 as a different source for also implying messages into base object A 402. In one embodiment, the possible sources for an object or contract are based on the definitions of the object or contract.

In one embodiment, the possible component messages for an object may be dynamic and based on the number of User Defined strategies that exist for a given object. For example, if a system includes outrights A, B, C and User Defined strategies for spreads UD1(+A, +B) and UD2(+A, −C), then the messages that can serve as sources for bids on A include: (1) Real bid orders on A; (2) Implied out bids from [+UD1, −B]; and (3) Implied out bids from [+UD2, +C]. The messages that can serve as sources for offers on A include (1) Real offer orders on A; Implied out offers from [−UD1, +B]; and Implied out offers from [−UD2, −C].

It should also be appreciated that the quantity associated with a message indicates how many units are available to buy or sell (depending on the message) of that object. When a quantity is aggregated and a message indicates or is associated with the aggregated quantity, the disclosed system checks the data structures holding the messages only one time, knowing that once a lookup is performed to a data structure, the system will match at least the aggregated amount before having to perform another lookup. Accessing aggregated quantities associated with multiple messages is less computationally expensive than accessing data stored in different structures. For example, computationally expensive may refer to the time, processing power, and/or resources required to perform a task in a computing environment.

Figure 10:
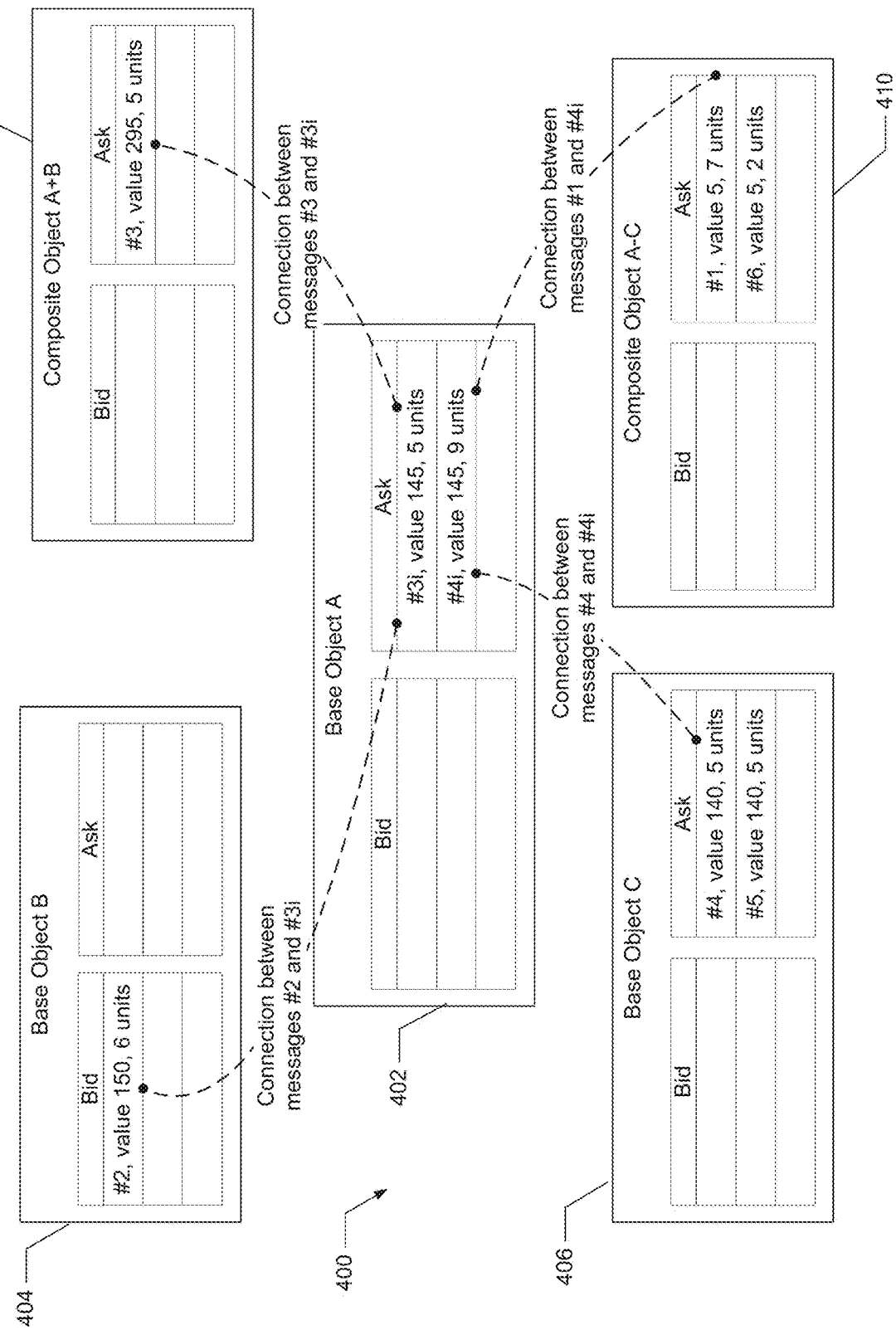
FIG. 10 depicts yet another illustrative embodiment of data structures holding example messages used to implement aspects of the disclosed embodiments.

The system next receives a message having priority number 6 to sell 2 units of object A-C 410 at a value of 5. As shown in FIG. 10, the system enters message 6 into the appropriate queue. It should be appreciated that the additional 2 units of object A-C 410 received via message 6 can be combined with 2 unused units of object C 406 from message 5 to imply 2 units of object A 402. However, instead of generating a new implied message having priority 6*i* (6 being the later of the two priorities, 5 and 6, used to imply the additional 2 units of object A), the system aggregates the 2 additional units of object A 402 with the 7 units of object A 402 already implied in message 4*i*. Thus, the quantity or number of units in message 4*i* is increased by 2 units, from 7 units to 9 units. Any subsequent match involving message 4*i* will attempt to fill 9 units before moving on to another message, e.g., for example, some other message having lower priority than message 4*i*.

In one embodiment, a first message having lower priority than a second message is processed after the second message is processed. Thus, in one embodiment, a first message having a lower priority than a second message means the first message will be processed after the second message. It should be appreciated that, in one embodiment, priorities for messages are relative values that can be used to compare messages and determine which message is processed first.

Figure 11:
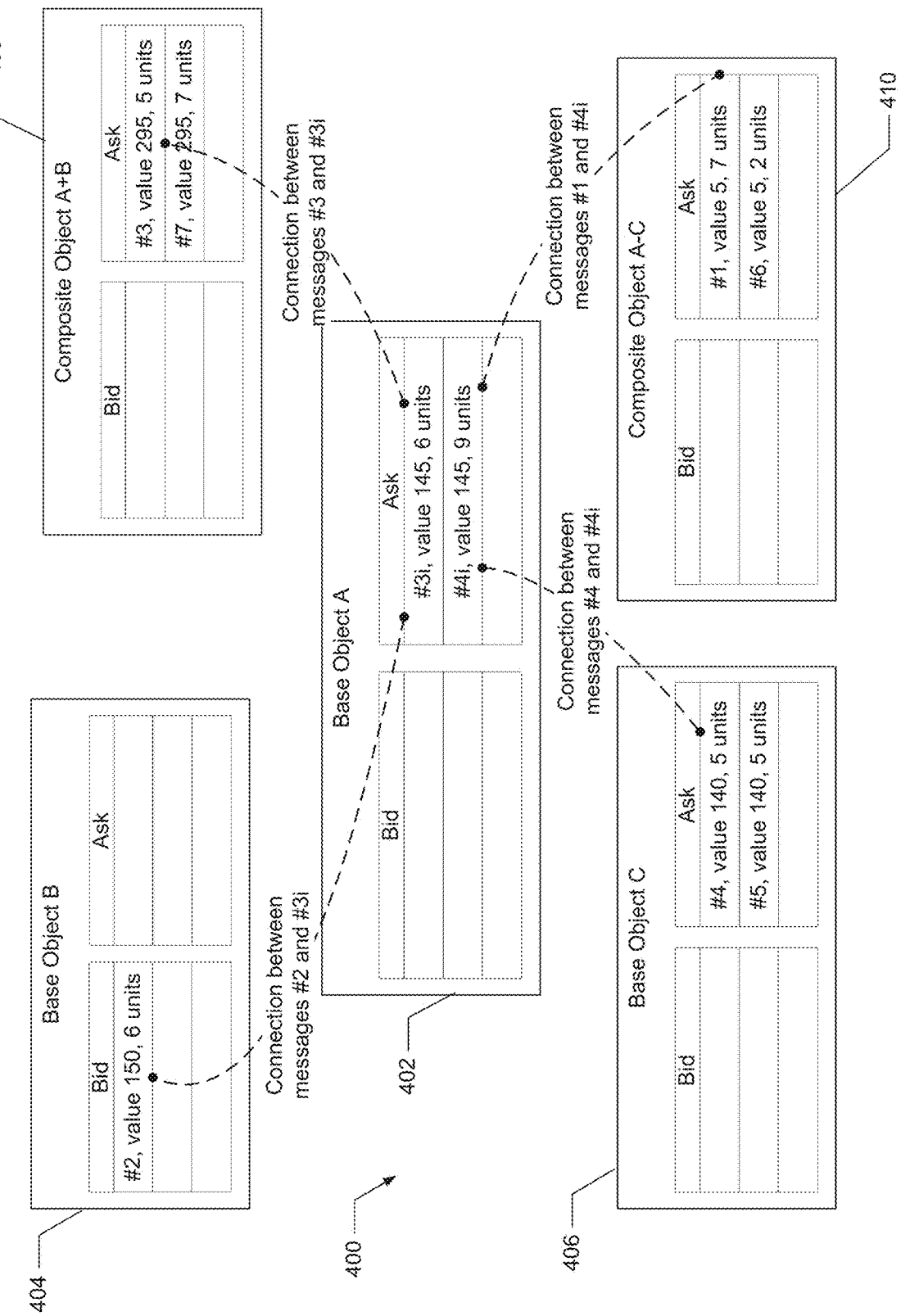
FIG. 11 depicts another illustrative embodiment of data structures holding example messages used to implement aspects of the disclosed embodiments.

The system next receives a message having priority number 7 to sell 7 units of object A+B 408 at a value of 295. As shown in FIG. 11, the system enters message 7 into the appropriate queue. It should be appreciated that the additional 7 units of object A+B 408 received via message 7 can be combined with 1 unused units of object B 404 from message 2 to imply 1 unit of object A 402. However, instead of generating a new implied message having priority 7*i* (7 being the later of the two priorities, 2 and 7, used to imply the additional 1 unit of object A), the system aggregates the 1 additional unit of object A 402 with the 5 units of object A 402 already implied in message 3*i*. Thus, the quantity or number of units in message 3*i* is increased by 1 unit, from 5 units to 6 units. It should also be appreciated that at least some of the object A 402 quantity facilitated by message 7 has been accorded a priority of 3*i*, even though message 4*i* which was generated before receipt of message 7 also includes units of object A 402. Thus, any subsequent match involving message 3*i* will attempt to fill 6 units before moving on to message 4*i*, which is lower in priority than message 4*i*. Thus, the units supplied by message #7 may be matched before the units supplied by message #1 in a trade involving object A 402 at a value of 145. In one embodiment, because the system attempts to use up 6 units supplied by the component messages of 3*i*, the system reduces the number of different lookups, thus increasing system performance and speed. For example, the system only performs a system lookup of the component messages of message #4*i* if the 6 units involved with message #3*i* are exhausted.

Figure 12:
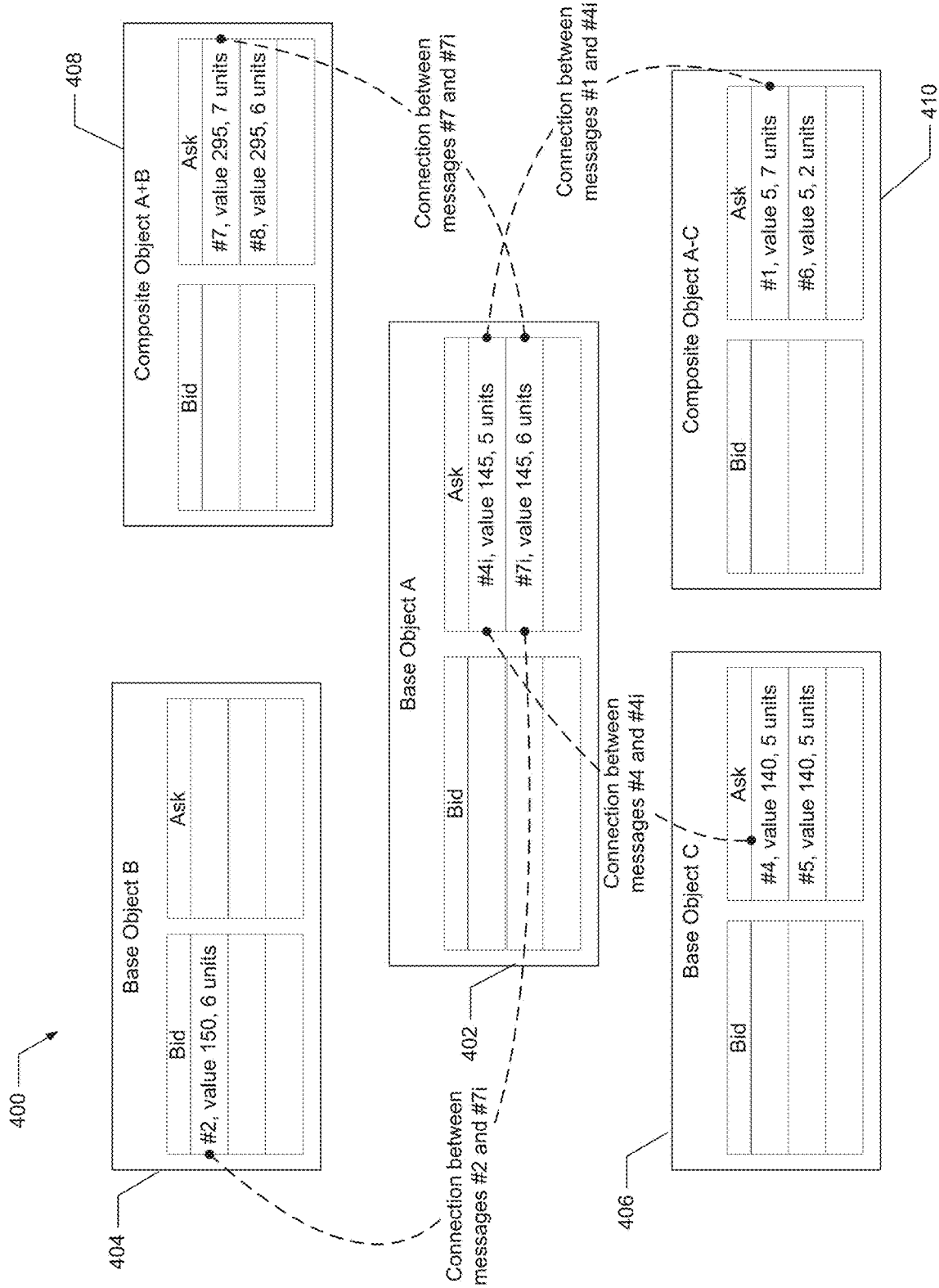
FIG. 12 depicts yet another illustrative embodiment of data structures holding example messages used to implement aspects of the disclosed embodiments.

The system re-evaluates priorities if any of the messages or orders in the queues are modified. For example, as shown in FIG. 12, if message 3 is modified so that its quantity increases from 5 to 6, message 3 is re-prioritized to the next available priority, namely, as priority number 8. Thus, as shown in FIG. 12, message 3 is canceled and removed from the object A+B 408 Ask queue, and message 8 is added after message 7. In other words, modifying the quantity in message 3 demotes that message to be after message 7 in the object A+B 408 Ask queue.

Upon modifying the priority of previous message 3, the implied messages, namely messages 3*i* and 4*i*, are re-evaluated based on the revised priorities. For example, as shown in FIG. 12, implied message 3*i* is modified to become implied message 7*i*. In other words, the priority of previous implied message 3*i* is changed to priority 7*i*. Within base object A's Ask queue, implied message 4*i* is now the highest priority message, and is accordingly moved ahead of implied message 7*i*. Thus, modification of message 3 resulted in implied message 4*i* being prioritized over implied message 7*i*. Moreover, the quantity associated with implied message 4*i* is changed to 5, because the combination of messages 1 and 4 can only be combined to imply 5 units in object A's Ask queue.

Accordingly, upon a match event involving selling (ask value) object A 402 at a value of 145, the first 5 units in the aggrising message would be matched with the units from the messages involved in creating message 4*i*, namely messages 1 and 4. It should be appreciated that the tables or queues that are accessed or looked up has accordingly been modified upon such a match event.

Figure 13:
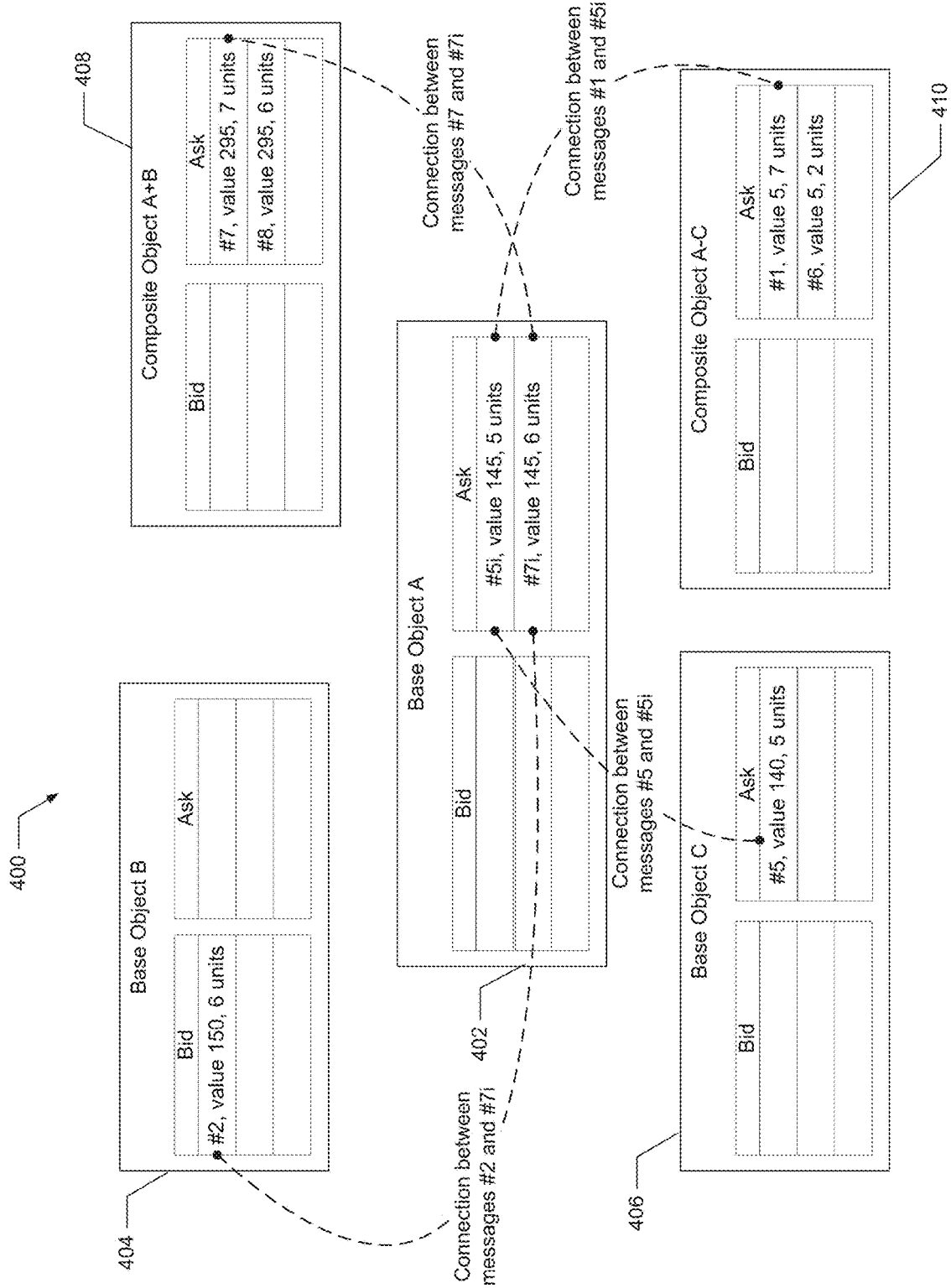
FIG. 13 depicts another illustrative embodiment of data structures holding example messages used to implement aspects of the disclosed embodiments.

The system re-evaluates priorities if any of the messages or orders in the queues are canceled. For example, as shown in FIG. 13, if message 4 is canceled via a message 9, e.g., by the original submitter of message 4, message 4 is removed from the object C 406 Ask queue, and message 5 is moved up as the first and sole message in that queue.

Upon modifying the priority of previous message 4, the implied messages, namely 5*i* and 7*i*, are re-evaluated based on the revised priorities. For example, as shown in FIG. 13, implied message 4*i* is modified to become implied message 5*i*. In other words, the priority of previous implied message 4*i* is changed to priority 5*i*. Within base object A's Ask queue, implied message 5*i* is still the highest priority message (because priority 5*i* is prioritized ahead of priority 7*i*). Thus, modification of message 4 did not result in the changing of message priority sequencing within base object A's Ask queue.

Figure 14:
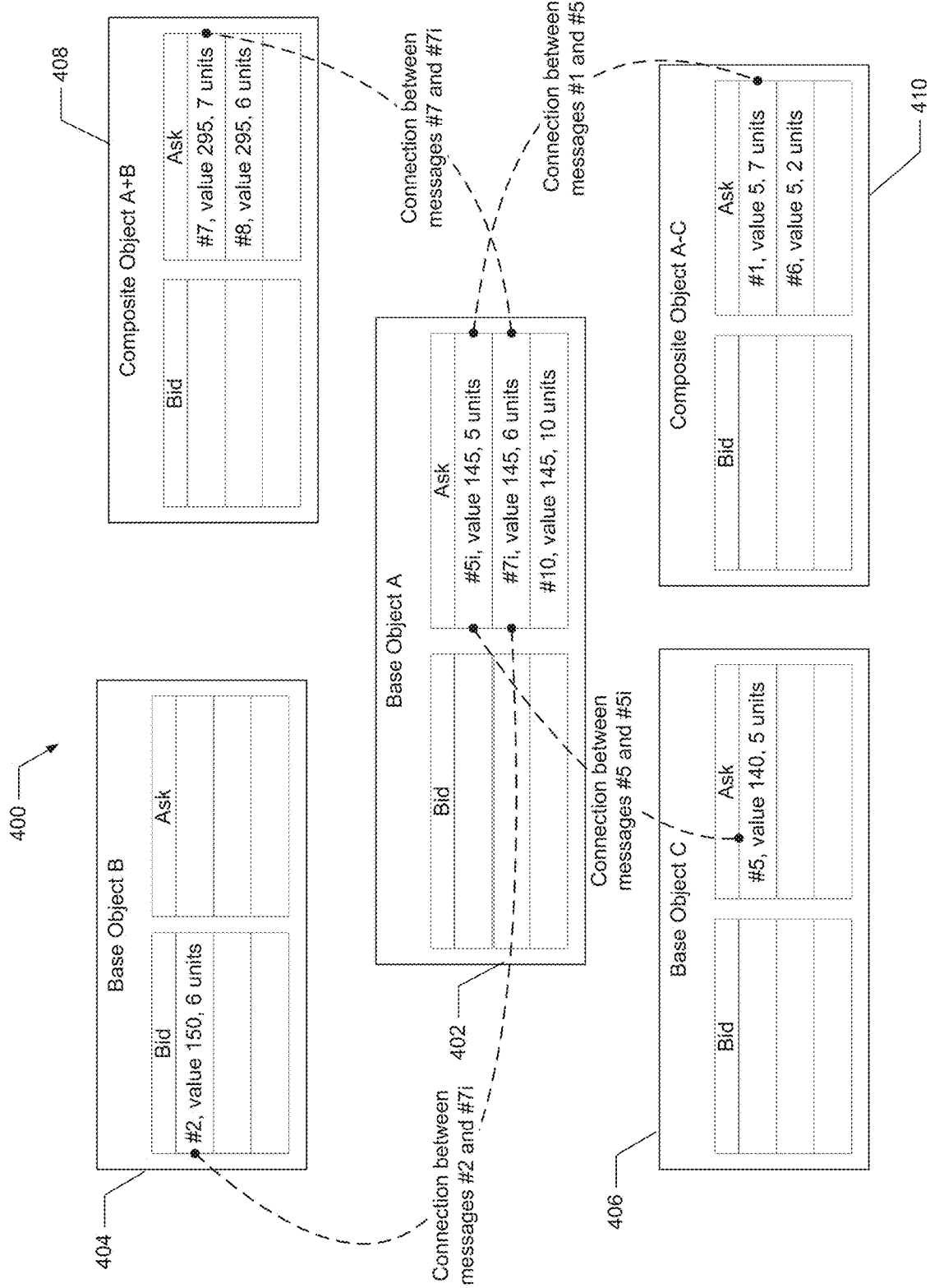
FIG. 14 depicts yet another illustrative embodiment of data structures holding example messages used to implement aspects of the disclosed embodiments.

As shown in FIG. 14, if the system receives an outright message 10 (and thus having priority number 10) to sell 10 units of object A 402 at a value of 145, the system enters message 10 into the appropriate queue. It should be appreciated that in base object A's Ask queue, an outright message (message 10) has been prioritized behind two implied messages (implied messages 5*i* and 7*i*).

Figure 15:
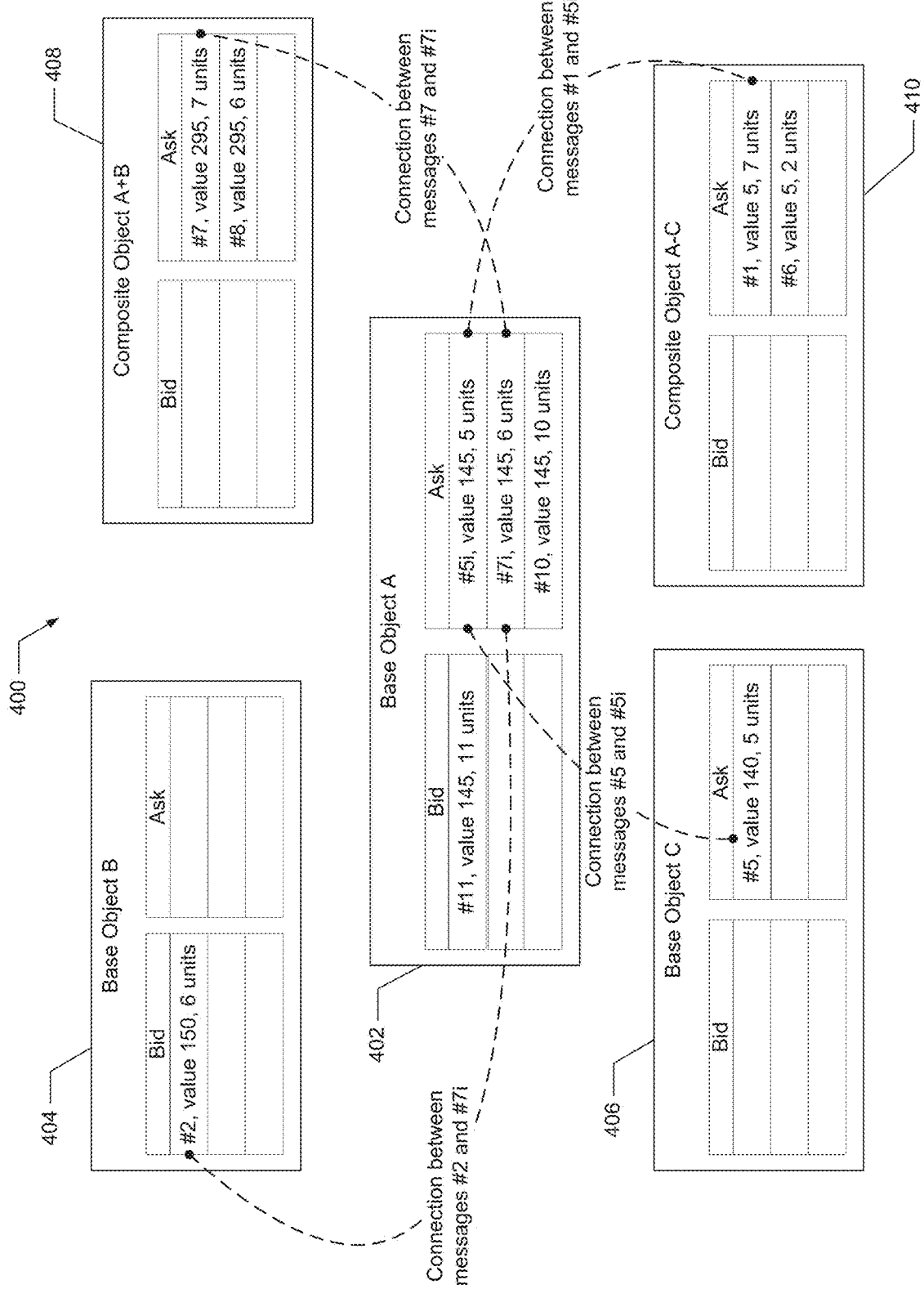
FIG. 15 depicts another illustrative embodiment of data structures holding example messages used to implement aspects of the disclosed embodiments.

The system re-evaluates priorities upon the occurrence of a match event. For example, as shown in FIG. 15, the system receives an outright message 11 (and thus having priority 11) to buy 11 units of object A 402 at a value of 145. As shown in FIG. 15, the system enters message 11 into the appropriate queue. Message 11 triggers a match event, because the system now includes messages in corresponding queues (e.g., messages in both the Bid and Ask queues) for the same object (e.g., object A) at the same value (e.g., 145).

Figure 16:
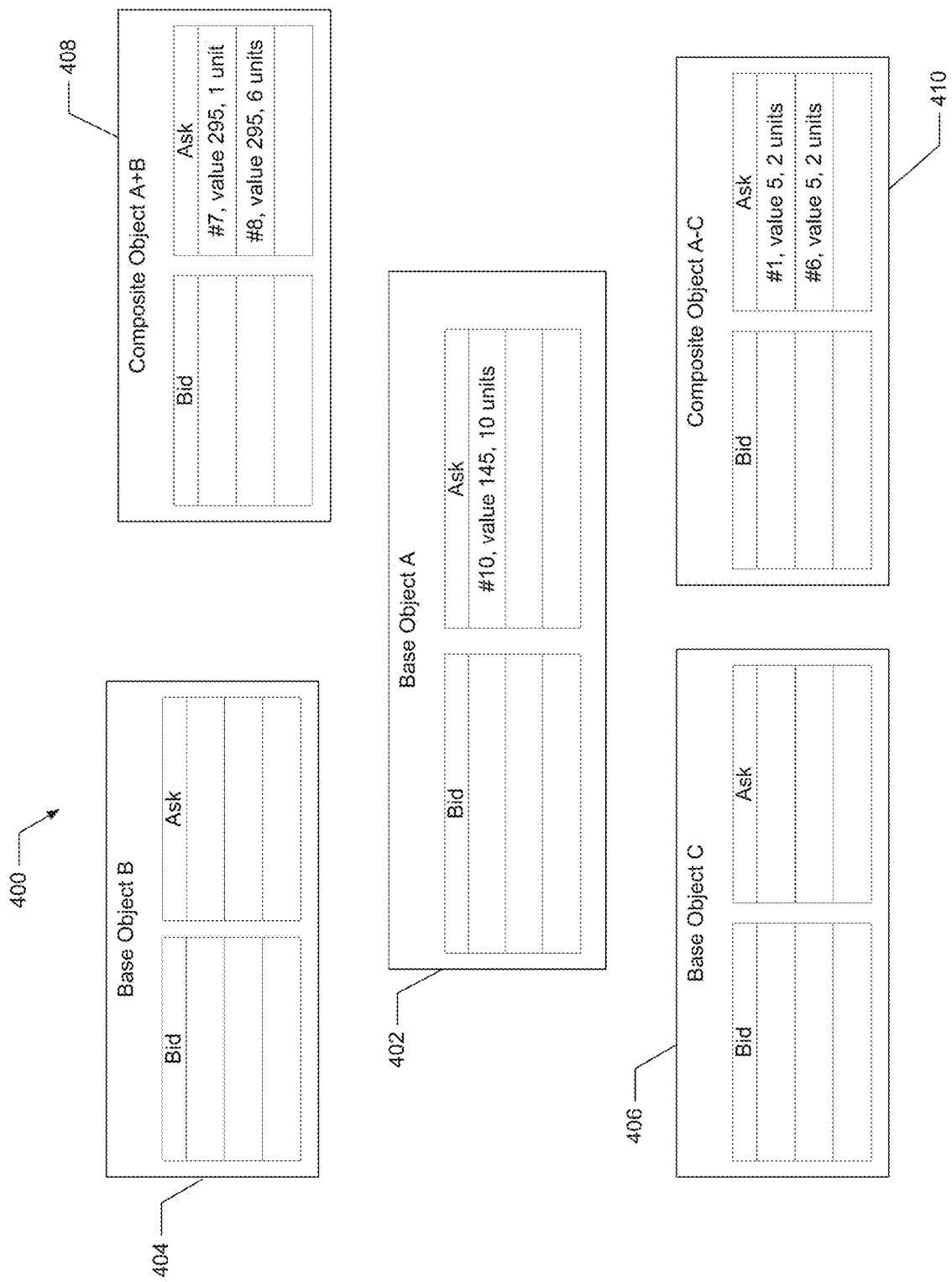
FIG. 16 depicts yet another illustrative embodiment of data structures holding example messages used to implement aspects of the disclosed embodiments.

As shown in FIG. 16, the match or trade completely fills the first two priorities in the Ask queue of object A 402. In particular, the quantities in messages 5*i* and 7*i* are filled completely due to aggrising message 11, which is also filled. Messages 5*i*, 7*i* and 11 are accordingly removed from their respective queues, and are accordingly no longer present in FIG. 16. Moreover, when implied messages are matched, the messages combined to create the matched implied message are filled, resulting in removal of quantity in those messages that were combined to create the matched implied message. For example, as shown in FIG. 16, because 5 units in implied message 5*i* are matched due to aggrising message 11, 5 units are removed from each of messages 1 and 5 (e.g., the messages used to create implied message 5*i*). Message 1 is accordingly reduced to 2 units, and message 5 is completely filled and thus removed from its queue. Similarly, as also shown in FIG. 16, because 6 units in implied message 7*i* are matched due to aggrising message 11, 6 units are removed from each of messages 2 and 7 (e.g., the messages used to create implied message 7*i*). Message 2 is accordingly completely filled and thus removed from its queue, and message 7 is reduced to 1 unit.

Figure 17:
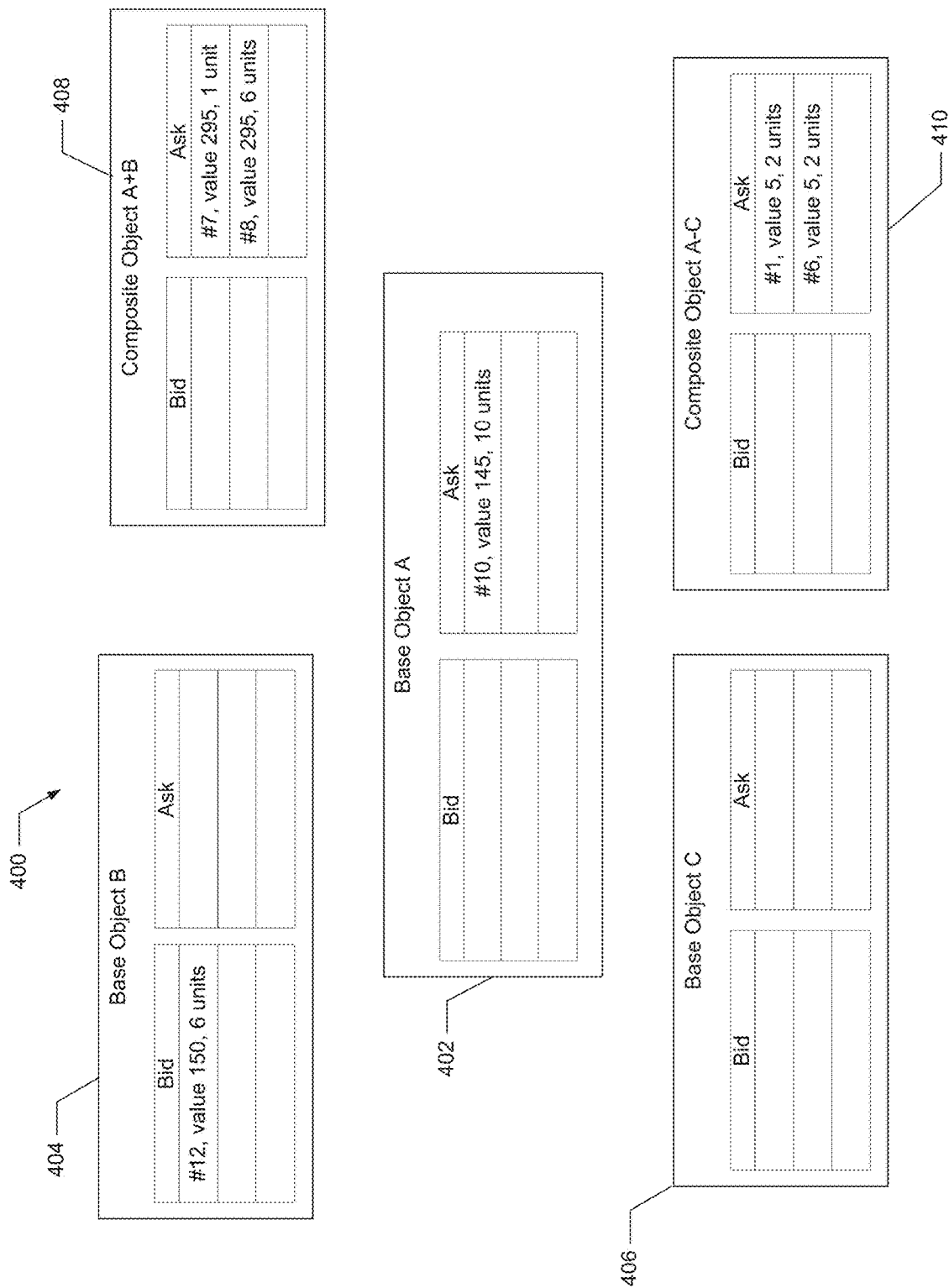
FIG. 17 depicts another illustrative embodiment of data structures holding example messages used to implement aspects of the disclosed embodiments.
Figure 18:
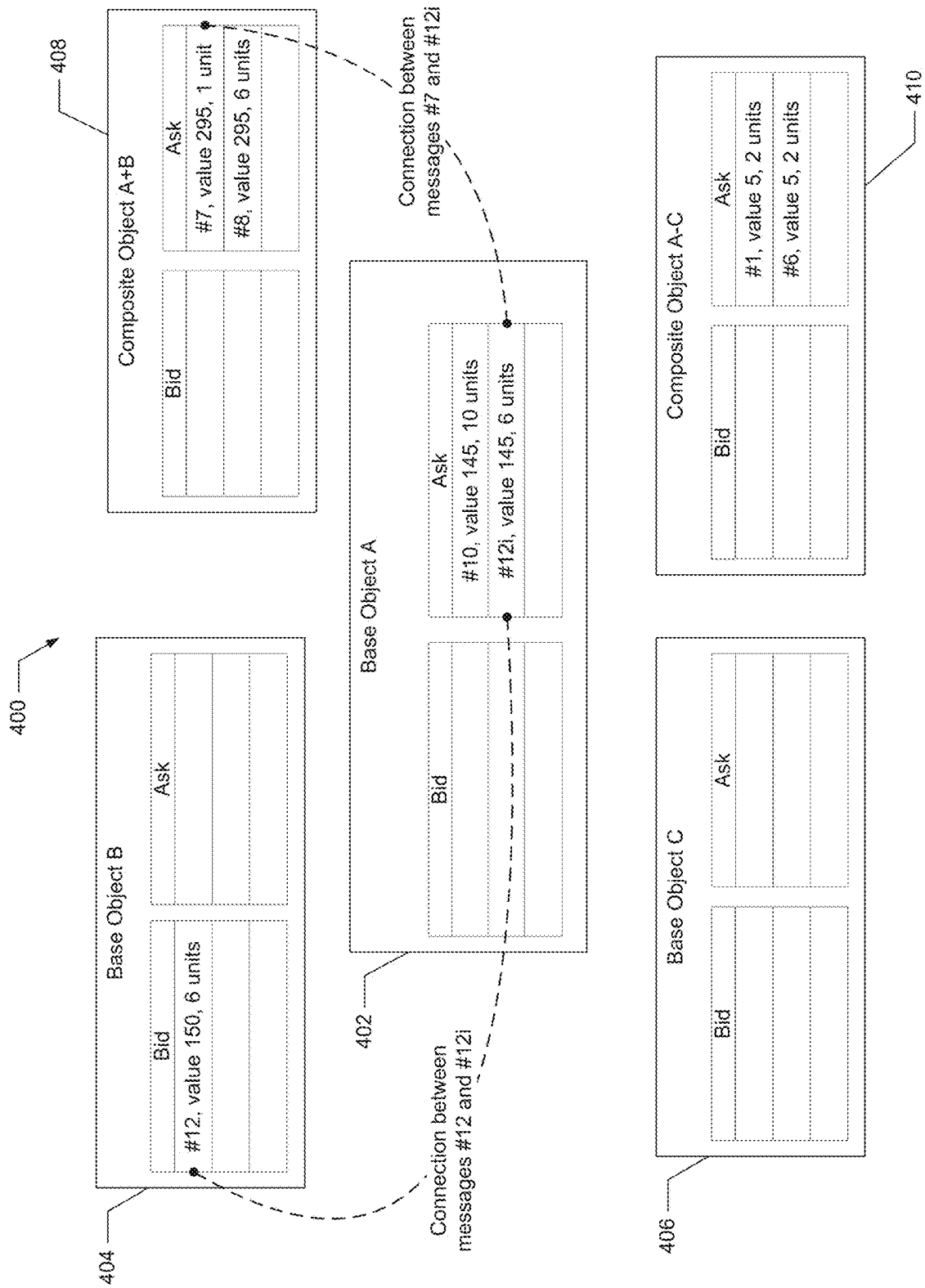
FIG. 18 depicts yet another illustrative embodiment of data structures holding example messages used to implement aspects of the disclosed embodiments.

Next, the system receives a message having priority number 12 to buy 6 units of object B 404 at a value of 150. As shown in FIG. 17, the system enters message 12 into the appropriate queue. The entry of message 12 allows the exchange computing system to imply an implied message into base object A 402. In particular, as shown in FIG. 18, the exchange uses messages 7 and 12 to generate an implied message to sell 6 units of object A 402 at a value of 145. Moreover, the implied message based on messages 7, 8 and 12 has a priority number 12 (indicated in FIG. 18 as #12*i*). The system also tracks the messages that were used to generate the implied message. As highlighted in FIG. 18 via dashed lines, the message indicated by #12*i* was implied due to a combination of message 7 (which will join with units from message #8) under object A+B 408 and message 12 under object B 404.

Figure 19:
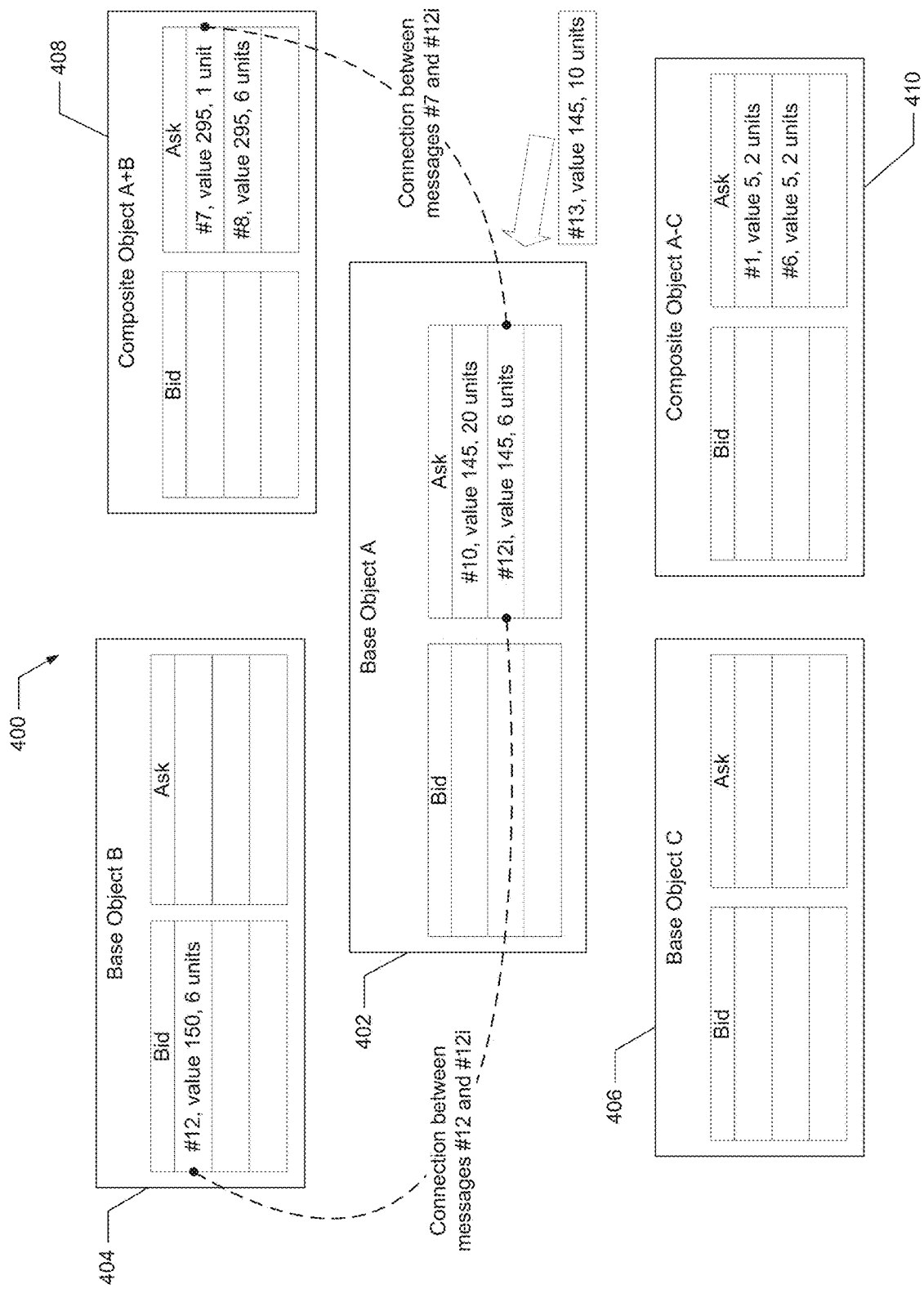
FIG. 19 depicts another illustrative embodiment of data structures holding example messages used to implement aspects of the disclosed embodiments.

The system next receives a message having priority number 13 to sell 10 units of object A 402 at a value of 145, as shown in FIG. 19. The system aggregates the 10 units of object A 402 from message 13 with the 10 units of object A 402 already present in the queue in message 10. Thus, the quantity or number of units in message 10 is increased by 10 units, from 10 units to 20 units. Any subsequent match involving message 10 will attempt to fill 20 units before moving on to the next priority message, namely, message #12*i*.

As discussed in the example embodiments, the priority is determined based on the message number. Priority may be determined based on a time stamp, or on a unique sequence number. In one embodiment, the system determines order book priority for implied orders by using the originating timestamps of the real orders that generated the implied order. In one embodiment, the priority for message may be based on a request for quote from a user of the system.

When the disclosed embodiments are applied to a financial exchange, once the system establishes a source priority for the implied order, any additional liquidity from that source is aggregated at the same priority. While this aspect improves performance of the match engine by reducing the need to re-evaluate priority for every submitted order, it also allows for a circumstance where later-arriving orders have order book priority and therefore may be filled before earlier-arriving orders.

In one embodiment, the disclosed system aggregates quantities from different messages that all share the same value but have different priorities. By aggregating messages of different priorities, the system allows a later received message to share the priority of an earlier received message. For example, in the example of FIG. 11, some of the quantities in message #7 are given the same priority as some of the quantities in message #3, namely, priority #3*i*, even though message #7 was received later than message #3. Such aggregation can be implemented to reduce the number of unique data lookups or callbacks to different data structures holding messages. For example, referring again to FIG. 11, the system may reduce the number of lookups to different tables because the system attempts to exhaust at least one of the messages (i.e., message #2) that are used to generate message #3*i* before attempting to match or process message #4*i*.

Figure 20:
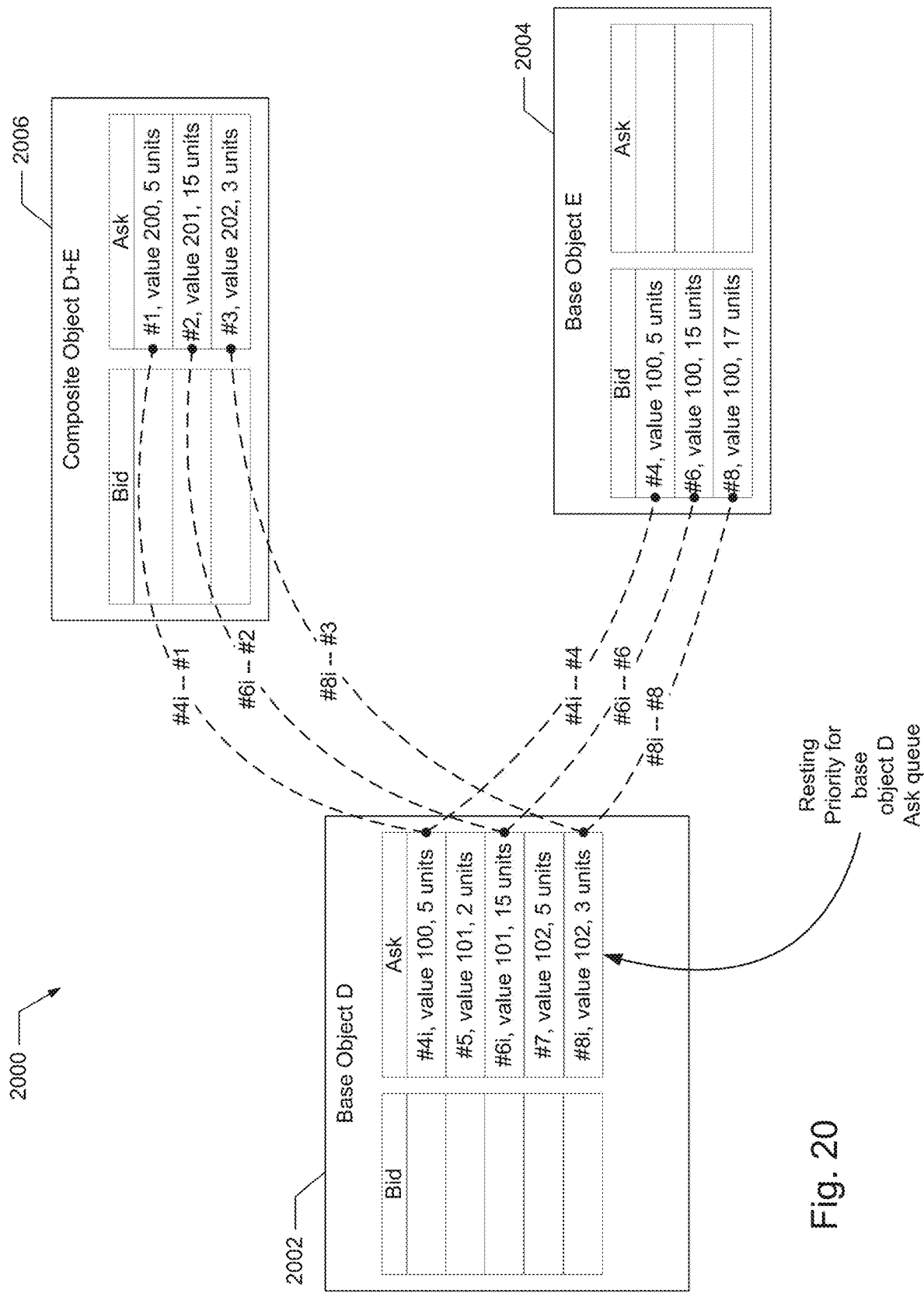
FIG. 20 depicts an illustrative embodiment of data structures holding example messages to illustrate aspects of the disclosed embodiments.

In one embodiment, the system reduces the number of data lookups by exhausting all the quantity available from a data structure before performing lookups from a different data structure. In another embodiment, upon a match event, the system may alter the priority of the messages to further reduce data lookups. For example, FIG. 20 illustrates an example state of a system including three objects 2002, 2004 and 2006, queue data structures for each object, and resting messages stored in their appropriate queues. In particular, the Ask queue for composite object D+E 2006 includes outright messages #1, #2, and #3. The Bid queue for base object E 2004 includes outright messages #4, #6, and #8. The Ask queue for base object D 2002 includes implied message #4*i*, outright message #5, implied message #6*i*, outright message #7, and implied message #8*i*. The messages are stored in their prioritized sequence, where messages #1, #4 and #4*i* are the highest priority messages in their respective queues. Thus, as indicated in FIG. 20, the resting priority of the Ask queue of base object D 2002 is: #4*i*, #5, #6*i*, #7, #8*i*. This resting priority indicates the priority in which messages for match will be considered.

Figure 21:
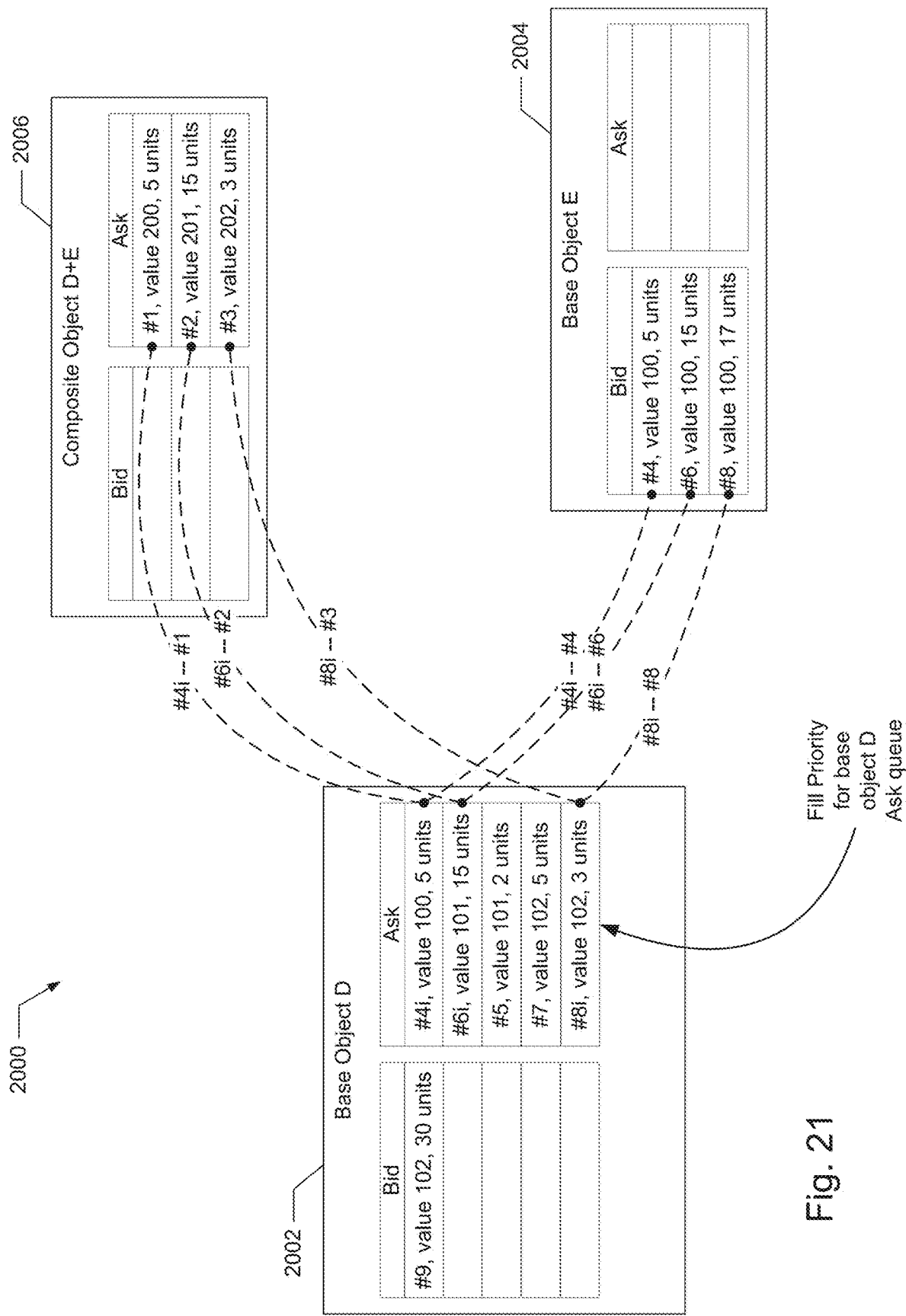
FIG. 21 depicts an illustrative embodiment of data structures holding example messages to illustrate aspects of the disclosed embodiments.

However, in one embodiment, depending upon when a match event is triggered, the system may alter the priority in which messages are filled to further reduce the number of data lookups. It should be appreciated that, in one embodiment, no matter the type of message (outright or implied), each message involved in a match event involves at least one data lookup. In particular, the system may alter priorities within the same price or value level by filling as many quantities from the same data structure. For example, FIG. 21 illustrates how the resting priority for the messages in the Ask queue for base object D 2002 are re-prioritized to further minimize data structure read/access operations upon receiving an aggressing order that triggers a match event. In particular, the system receives message #9 to buy 30 units of object D 2002 at value 102 or better. This incoming order triggers a match event that matches with some or all of the resting messages in the FIG. 21 queues. As indicated in FIG. 21, the system re-prioritizes the Ask queue of base object D 2002 as: #4*i*, #6*i*, #5, #8*i*, #7. Thus, the system matches 5 of the incoming units at value 100 from message #4*i*. This first match event requires the system to access the data structure storing message #1 for composite object D+E 2006 and the data structure storing message #4 for base object E 2004. Instead of next filling message #5 as indicated by FIG. 20, the system instead fills message #6*i*. Because the system has already accessed the data structures for composite object D+E 2006 and base object E 2004, the system prefers to fill as many messages as possible having those same data structures as the source. Thus, the system next fills 15 units at value 101 from message #6*i*. The system then fills 2 units at value 101 from message #5. If message #9 had only included a quantity of, for example, 7 units, the FIG. 21 priority would have filled all 7 units by only accessing the data structures for composite object D+E 2006 and base object E 2004. In contrast, if message #9 had only included a quantity of, for example, 7 units, the FIG. 20 priority would have filled 5 units by accessing the data structures for composite object D+E 2006 and base object E 2004, and filled the next 2 units by filling message #5 which would require separately accessing the data structures storing outright orders associated with message #5. Or, if message #5 had been an implied message having different sources than composite object D+E 2006 and base object E 2004, the system would have accessed the data structures associated with those different sources.

In one embodiment, when an order trades, is modified, or is cancelled, the priority is re-evaluated based on the updated book and corresponding timestamps or priorities. Re-evaluation only occurs once when an aggressing order triggers a match event. In other words, the system does not need to re-evaluate priority for every order book event (modifies, cancels, etc.), but only when there is a match.

Figure 22:
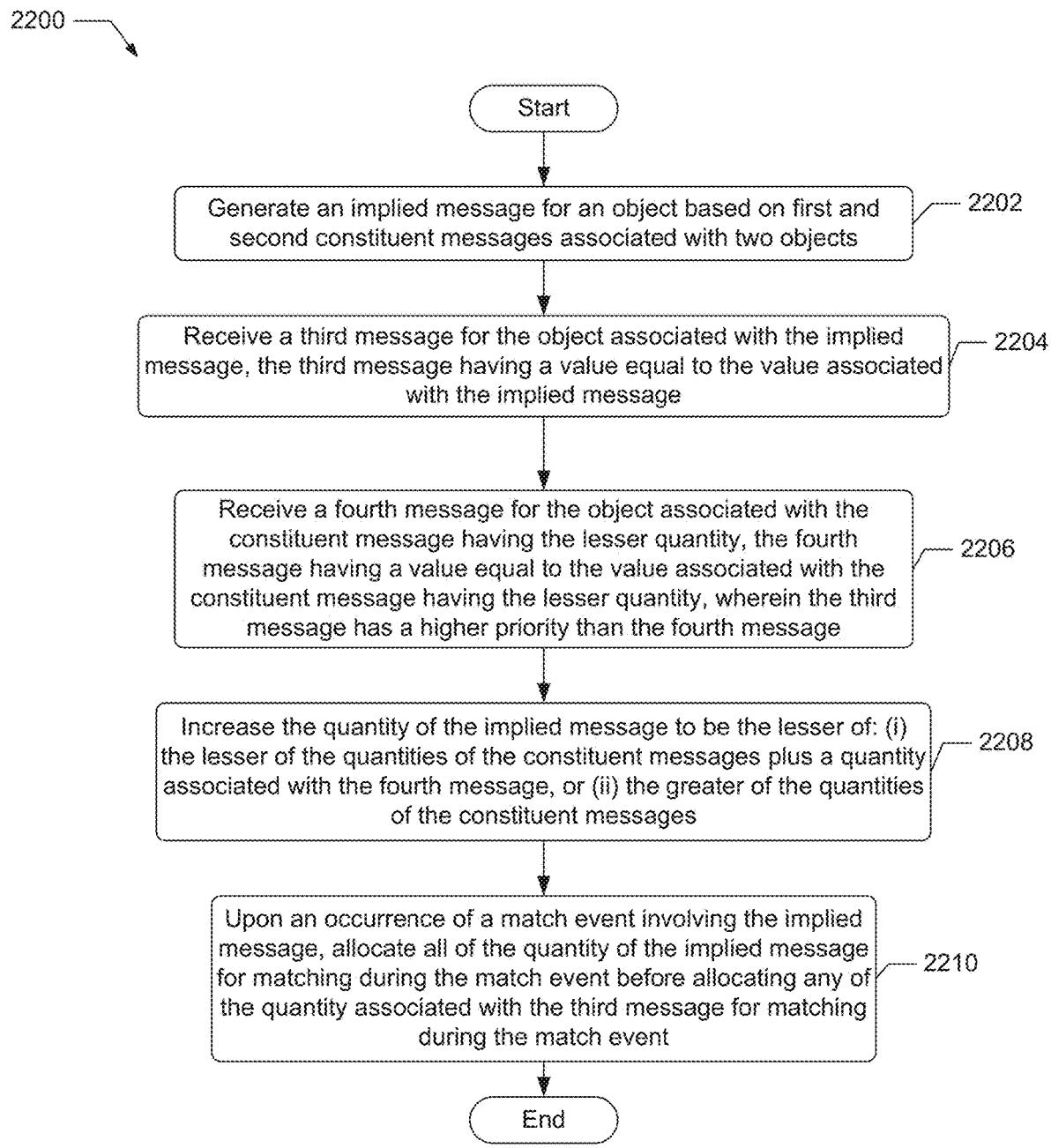
FIG. 22 depicts an example flowchart for implementing an aggregation and data lookup reduction system in accordance with the disclosed embodiments.

FIG. 22 illustrates an example flowchart 2200 indicating a method of implementing the disclosed data access reduction system, as may be implemented with computer devices and computer networks, such as those described with respect to FIGS. 1 and 2. Embodiments may involve all, more or fewer actions indicated by the blocks of FIG. 22. The actions may be performed in the order or sequence shown or in a different sequence. In one embodiment, the steps of FIG. 22 may be carried out by match engine module 106.

As discussed herein, in one embodiment, the exchange computing system may represent information about financial instruments as objects. Relatedly, information about the order book for a financial instrument may be represented as an object. An order book as discussed herein stores information about buy (i.e., Bid) and sell (i.e., Ask) orders or messages for a financial instrument or product at specified values and quantities. The priority applied to the messages determines the sequence in which messages are processed upon a match event. For example, if multiple messages relate to buying a financial instrument at the same value or price, the match engine module may implement the disclosed priority techniques to select which of the value-equivalent messages to match first.

The exchange computing system may store incoming or resting messages for objects (e.g., contracts or financial instruments) in data structures such as queues. In one embodiment, the exchange computing system may keep track of which objects can imply messages into other objects. When the system queues include two messages (e.g., first and second constituent messages) that can be used to imply a message, the exchange computing system generates an implied message for an object based on the first and second constituent messages associated with two objects, as shown in block 2202. The quantity and the priority of the implied message are based on the two constituent messages, or the two messages used to generate the implied message. For example, the quantity (e.g., amount available to match) of the implied message may be equal to the smaller of the quantities of the two constituent messages, because that is the only amount that can be implied and fulfilled. The priority of the implied message may be set as equal to the lower of the priorities of the two constituent messages. Thus, an implied message can only have a priority that is lower than or equal to all of its constituent messages. The value of the implied message depends on the relationship between the involved objects. For example, if a contract B and a another contract A+B are used to imply a value for contract A, the system would calculate a value for an implied message for contract A as described for example in connection with FIG. 6.

The exchange computing system may then receive another message for the object associated with the implied object, as shown in block 2204. This newly received message, e.g., third message, may be at the same value as the implied message. If the third message was at a "better" price than the implied message, it would be placed ahead of the implied message in terms for priority in the queue. However, in the example of FIG. 22, the third message is associated with the same value as the implied message, and is received after the implied message, and is accordingly prioritized after the implied message.

The system may then receive a fourth message (having a lower priority than the third message, because it is received after the third message) for the object associated with the constituent message having the lesser quantity (compared to the other constituent message), as shown in block 2206. The fourth message is for the same object, action and value as the constituent message having the lesser quantity. Thus, the fourth message can be combined with the other constituent message (having the greater quantity) to imply additional quantity for the implied message. Instead of generating a new implied message, the system increases the quantity of the implied message, thus making more quantity available from the sources or objects associated with the original two constituent messages, as shown in block 2208. In other words, quantity from the fourth message may be matched ahead of quantity from the third message, even though the fourth message was received later than the third message.

It should be appreciated that when two messages are combined to generate or imply a message, the quantity of the implied message can only be equal to the lesser of the quantities of the constituent messages. The constituent message with the lesser quantity may thus be viewed as the limiting constituent message. When another later message (e.g., a supplementing constituent message) is received that can supplement the limiting constituent message, the exchange computing system increases the quantity of the implied message to be as much as possible. Thus, the supplementing constituent message, even though received later, is matched in the same transaction as the original two constituent messages. Thus, referring back to FIG. 22, the fourth message may be viewed as supplementing the quantity for the message that was the limiting constituent message.

Upon an occurrence of a match event involving the implied message, the match engine module may allocate all of the quantity of the implied message (which has been supplemented by quantity from the fourth message) for matching during the match event before allocating any of the quantity associated with the third message for matching during the match event, as shown in block 2210. In one embodiment, the match engine module may be specifically configured to automatically allocate quantities as discussed herein upon an occurrence of a match event involving the implied message.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for selective out of order processing of ordered data stored in queues to reduce data lookups, the method comprising:

generating, by a processor in communication with a memory, an implied message for an object based on a first constituent message associated with a first constituent object and stored in a first queue in the memory and a second constituent message associated with a second constituent object stored in a second queue in the memory, wherein each of the constituent messages is associated with a value, a priority, and a quantity, wherein one of the constituent messages is associated with a processing priority that is lower than the other constituent message, wherein one of the constituent messages is associated with a quantity that is lesser than the other constituent message, and wherein the implied message is associated with a value based on the values of the constituent messages, a processing priority that is equivalent to the lower of the priorities of the constituent messages, and a quantity that is equivalent to the lesser of the quantities of the constituent messages;

storing the implied message in a third queue in the memory;

receiving, and storing in the third queue, a third message for the object associated with the implied message, the third message having a value equal to the value associated with the implied message;

receiving, and storing in one of the first or second queues, a fourth message for the first or second constituent object associated with the first or second constituent message having the lesser quantity, the fourth message having a value equal to the value associated with the first or second constituent message having the lesser quantity, wherein the third message has a higher processing priority than the fourth message;

increasing the quantity of the implied message to be the lesser of: (i) the lesser of the quantities of the constituent messages plus a quantity associated with the fourth message, or (ii) the greater of the quantities of the constituent messages; and upon an occurrence of a match event which causes the processing of the implied message, automatically allocating all of the increased quantity of the implied message for matching during the match event, the allocating of the increased quantity comprising accessing the first or second queues to process the fourth message, before allocating any of the quantity associated with the third message for matching during the match event, whereby the increased quantity of the implied message automatically causes the processing of the third message and access to queues associated therewith to be avoided.

2. The computer implemented method of claim 1, wherein each message is associated with an object, a priority, an action to be performed on the associated object at a specified value, and a quantity.

3. The computer implemented method of claim 1, wherein an occurrence of a match event requires requesting access to data stored in a queue data structure in the memory and associated with a message involved in the match event.

4. The computer implemented method of claim 3, wherein the method further includes, for each object, storing all actions of a first type in a first queue, and all actions of a second type in a second queue.

5. The computer implemented method of claim 4, wherein actions of the first type are one of buying or selling a financial instrument, and actions of the second type are the other of buying or selling the financial instrument.

6. The computer implemented method of claim 3, wherein data associated with different messages and stored in a same data structure can be accessed in one transaction.

7. The computer implemented method of claim 3, wherein accessing data stored in a same data structure is less computationally expensive than accessing data stored in different data structures.

8. The computer implemented method of claim 3, wherein accessing data stored in a same data structure is quicker than accessing data stored in different data structures.

9. The computer implemented method of claim 1, wherein the objects comprise order books for financial instruments.

10. The computer implemented method of claim 9, wherein the first, second, third and fourth messages are messages (i) generated by devices associated with users of an exchange computing system and (ii) associated with financial instruments.

11. The computer implemented method of claim 9, wherein the first, second and fourth messages are outright messages associated with financial instruments, wherein the implied message is a first implied message associated with a financial instrument, and wherein the third message is a second implied message associated with a financial instrument and based on two constituent messages.

12. A computer implemented method for selective out of order processing of ordered data stored in queues to reduce data lookups by a processor in communication with a memory, the method comprising:

receiving, by the processor, a first message for a first object, the first message having a first value, a first processing priority, and a first quantity, and storing the first message in a first queue in the memory;

receiving, by the processor, a second message for a second object, the second message having a second value, a second processing priority lower than the first priority, and a second quantity greater than the first quantity, and storing the second message in a second queue in the memory;

generating, by the processor, a third message for a third object based on the first and second messages, including:

calculating a third value for the third message based on the first and second values;

assigning the second processing priority as a third priority for the third message; and assigning the first quantity as a third quantity for the third message; and storing the third message in a third queue in the memory; and wherein the method further includes:

receiving, by the processor, a fourth message for the third object, the fourth message having a fourth value equal to the third value, a fourth processing priority lower than the third processing priority, and a fourth quantity; and storing the fourth message in the third queue;

receiving, by the processor, a fifth message for the first object, the fifth message having a fifth value equal to the first value, a fifth processing priority lower than the fourth processing priority, and a fifth quantity, and storing the fifth message in the first queue;

increasing, by the processor, the third quantity to be the lesser of: (i) the first quantity plus the fifth quantity or (ii) the second quantity;

receiving, by the processor, a sixth message for the third object; and upon determining an occurrence of a match event between the third and sixth messages, automatically allocating all of the increased third quantity for matching with the sixth quantity, the allocating of the increased quantity comprising accessing the first or second queues to process the fourth message, before allocating any of the fourth quantity for matching with the sixth quantity, whereby the increased quantity of the third message automatically causes the processing of the fourth message and access to queues associated therewith to be avoided.

13. The computer implemented method of claim 12, wherein allocating all of the third quantity for matching with the sixth quantity before allocating any of the fourth quantity for matching with the sixth quantity eliminates a data access request to the data structure storing information about the fourth message.

14. The computer implemented method of claim 13, wherein the data access requests include data read requests and data write requests.

15. The computer implemented method of claim 12, which includes:
   (i) if the quantity matched during the match event is less than the third quantity, reducing the third quantity by the quantity matched during the match event; and
   (ii) if the quantity matched during the match event is greater than or equal to the third quantity, removing the third message.

16. The computer implemented method of claim 15, wherein reducing the third quantity or removing the third message requires requesting data access to a data structure storing information about the third message.

17. The computer implemented method of claim 12, wherein the match event occurs when the third message includes an instruction to perform a first action on the third object at the third value and the sixth message includes an instruction to perform a second action complementary to the first action on the third object at a sixth value equal to the third value.

18. The computer implemented method of claim 17, wherein the first action is one of buying or selling the third object and the second action is the other of buying or selling the third object.

19. The computer implemented method of claim 12, wherein the third object is associated with the combination of the first and second objects.

20. The computer implemented method of claim 19, wherein messages for the third object can be implied from a combination of messages for the first and second objects.

21. The computer implemented method of claim 20, wherein the third message is an implied message and the first and second messages are constituent messages of the third message that are combined to generate the third message.

22. The computer implemented method of claim 12, wherein each message is associated with an object and an action to be performed on the associated object.

23. The computer implemented method of claim 12, wherein the fifth quantity is prioritized over the fourth quantity even though the fifth priority is lower than the fourth priority.

24. The computer implemented method of claim 23, wherein the fifth quantity is prioritized over the fourth quantity due to the first and second messages having implied the third message and the fifth message being associated with the same object as the first message which is a constituent message for the third message.

25. The computer implemented method of claim 12, wherein the second priority is assigned as the third priority for the third message because the second priority is lower than the first priority, and wherein the first quantity is assigned as the third quantity for the third message because the first quantity is lesser than the second quantity.

26. The computer implemented method of claim 12, wherein a quantity associated with a message for an object represents how many units of a financial instrument associated with the object are available for matching.

27. The computer implemented method of claim 12, wherein data associated with each of the first, second, and third messages are stored in different data structures.

28. The computer implemented method of claim 12, wherein data associated with the fourth message is stored in the same data structure as the third message, and wherein data associated with the fifth message is stored in the same data structure as the first message.

29. The computer implemented method of claim 12, wherein data associated with different messages and stored in a same data structure can be accessed in one transaction.

30. The computer implemented method of claim 12, wherein accessing data stored in a same data structure is less computationally expensive than accessing data stored in different data structures.

31. The computer implemented method of claim 12, wherein the objects represent one of: financial instruments or order books for financial instruments.

32. A computer system for selective out of order processing of ordered data stored in queues to reduce data lookups, the system including a computer processor coupled with a memory, the computer processor specifically configured to:
   generate, by a processor in communication with a memory, an implied message for an object based on a first constituent message associated with a first constituent object and stored in a first queue in the memory and a second constituent message associated with a second constituent object stored in a second queue in the memory, wherein each of the constituent messages is associated with a value, a processing priority, and a quantity, wherein one of the constituent messages is associated with a processing priority that is lower than the other constituent message, wherein one of the constituent messages is associated with a quantity that is lesser than the other constituent message, and wherein the implied message is associated with a value based on the values of the constituent messages, a processing priority that is equivalent to the lower of the priorities of the constituent messages, and a quantity that is equivalent to the lesser of the quantities of the constituent messages;
   store the implied message in a third queue in the memory;
   receive, and store in the third queue, a third message for the object associated with the implied message, the third message having a value equal to the value associated with the implied message;
   receive, and store in one of the first or second queues, a fourth message for the first or second constituent object associated with the first or second constituent message having the lesser quantity, the fourth message having a value equal to the value associated with the first or second constituent message having the lesser quantity, wherein the third message has a higher processing priority than the fourth message;
   increase the quantity of the implied message to be the lesser of: (i) the lesser of the quantities of the constituent messages plus a quantity associated with the fourth message, or (ii) the greater of the quantities of the constituent messages; and
   upon an occurrence of a match event which causes the processing of the implied message, automatically allocate all of the increased quantity of the implied message for matching during the match event, the allocating of the increased quantity comprising accessing the first or second queues to process the fourth message, before allocating any of the quantity associated with the third message for matching during the match event, whereby the increased quantity of the implied message automatically causes the processing of the third message and access to queues associated therewith to be avoided.

33. The computer system of claim 32, wherein the computer processor is further specifically configured to associate each message with an object, a priority, an action to be performed on the associated object at a specified value, and a quantity.

34. The computer system of claim 32, wherein the computer processor is further specifically configured to, upon an occurrence of a match event, request access to data stored in the memory and associated with a message involved in the match event.

35. The computer system of claim 32, wherein the computer processor is further specifically configured to, for each object, store all actions of a first type in a first queue, and all actions of a second type in a second queue.

36. The computer system of claim 35, wherein actions of the first type are one of buying or selling a financial instrument, and actions of the second type are the other of buying or selling the financial instrument.

37. The computer system of claim 34, wherein the computer processor is further specifically configured to access data associated with different messages and stored in a same data structure in one transaction.

38. The computer system of claim 34, wherein accessing data stored in a same data structure is less computationally expensive than accessing data stored in different data structures.

39. The computer system of claim 34, wherein accessing data stored in a same data structure is quicker than accessing data stored in different data structures.

40. The computer system of claim 32, wherein the objects comprise order books for financial instruments.

41. The computer system of claim 40, wherein the first, second, third and fourth messages are messages (i) generated by devices associated with users of an exchange computing system and (ii) associated with financial instruments.

42. The computer system of claim 40, wherein the first, second and fourth messages are outright messages associated with financial instruments, wherein the implied message is a first implied message associated with a financial instrument, and wherein the third message is a second implied message associated with a financial instrument and based on two constituent messages.

43. A computer system for selective out of order processing of ordered data stored in queues to reduce data lookups associated with processing of messages, the system comprising:

means for generating an implied message for an object based on a first constituent message associated with a first constituent object and stored in a first queue in the memory and a second constituent message associated with a second constituent object stored in a second queue in the memory, wherein each of the constituent messages is associated with a value, a processing priority, and a quantity, and wherein the implied message is associated with a value based on the values of the constituent messages, a processing priority that is the lower of the priorities of the constituent messages, and a quantity that is the lesser of the quantities of the constituent messages;

means for storing the implied message in a third queue in the memory;

means for receiving and storing the third queue, a third message for the object associated with the implied message, the third message having a value equal to the value associated with the implied message;

means for receiving and storing in one of the first or second queues, a fourth message for the first or second constituent object associated with the first or second constituent message having the lesser quantity, the fourth message having a value equal to the value associated with the first or second constituent message having the lesser quantity, wherein the third message has a higher processing priority than the fourth message;

means for increasing the quantity of the implied message to be the lesser of: (i) the lesser of the quantities of the constituent messages plus a quantity associated with the fourth message, or (ii) the greater of the quantities of the constituent messages; and upon an occurrence of a match event which causes the processing of the implied message, means for allocating all of the increased quantity of the implied message for matching during the match event, the allocating of the increased quantity comprising accessing the first or second queues to process the fourth message, before allocating any of the quantity associated with the third message for matching during the match event, whereby the increased quantity of the implied message automatically causes the processing of the third message and access to queues associated therewith to be avoided.

* * * * *